(12) United States Patent
Ochiai

(10) Patent No.: US 11,726,167 B2
(45) Date of Patent: Aug. 15, 2023

(54) RADAR COVER AND METHOD FOR MANUFACTURING RADAR COVER

(71) Applicant: FALTEC Co., Ltd., Kawasaki (JP)

(72) Inventor: Takumi Ochiai, Kawasaki (JP)

(73) Assignee: FALTEC Co., Ltd., Kawasaki (JP)

( * ) Notice: Subject to any disclaimer, the term of this patent is extended or adjusted under 35 U.S.C. 154(b) by 1093 days.

(21) Appl. No.: 16/462,426

(22) PCT Filed: Dec. 22, 2017

(86) PCT No.: PCT/JP2017/046115
§ 371 (c)(1),
(2) Date: May 20, 2019

(87) PCT Pub. No.: WO2018/123859
PCT Pub. Date: Jul. 5, 2018

(65) Prior Publication Data
US 2019/0361090 A1    Nov. 28, 2019

(30) Foreign Application Priority Data

Dec. 27, 2016  (JP) .............................. JP2016-252957
Jan. 17, 2017  (JP) .............................. JP2017-005813

(51) Int. Cl.
*G01S 7/03*   (2006.01)
*B29C 45/14*  (2006.01)
(Continued)

(52) U.S. Cl.
CPC ................ *G01S 7/03* (2013.01); *B60R 13/04* (2013.01); *G01S 13/931* (2013.01);
(Continued)

(58) Field of Classification Search
CPC .......... G01S 7/03; G01S 7/027; G01S 13/931; B29C 45/14336
See application file for complete search history.

(56) References Cited

U.S. PATENT DOCUMENTS

| 8,377,242 B2 * | 2/2013 | Fujii | ................... H01Q 1/3233 |
| | | | 156/219 |
| 2004/0125023 A1 * | 7/2004 | Fujii | ....................... H01Q 1/40 |
| | | | 343/711 |
| 2016/0261034 A1 | 9/2016 | Geise | |

FOREIGN PATENT DOCUMENTS

CN    101271999 A    9/2008
CN    101325277 A    12/2008
(Continued)

OTHER PUBLICATIONS

International Search Report dated Feb. 13, 2018 for PCT Application No. PCT/JP2017/046115.
(Continued)

*Primary Examiner* — Edmund H Lee
(74) *Attorney, Agent, or Firm* — Moser Taboada

(57) ABSTRACT

A radar cover is disposed on a path of a radio wave of a radar unit for detecting a surrounding situation of a vehicle. The radar cover includes, a plate-like transparent member having a housing recess recessed toward a front and formed on a back surface thereof, a colored core housed in the housing recess in a state of being in contact with a bottom surface of the housing recess, and a support member bonded to the back surface of the transparent member. In at least a portion of a region forming the housing recess when viewed from a front side of the transparent member, the depth of the housing recess is set to be larger than the thickness of the colored core, and a portion of the support member is filled in a region where the colored core is not disposed in a space surrounded by the housing recess.

12 Claims, 18 Drawing Sheets

(51) Int. Cl.
*B60R 13/04* (2006.01)
*G01S 13/931* (2020.01)
*B29K 33/00* (2006.01)
*B29K 69/00* (2006.01)
*B29L 31/30* (2006.01)

(52) U.S. Cl.
CPC .... *B29C 45/14336* (2013.01); *B29K 2033/12* (2013.01); *B29K 2069/00* (2013.01); *B29K 2995/0026* (2013.01); *B29L 2031/30* (2013.01)

(56) References Cited

FOREIGN PATENT DOCUMENTS

| | | | |
|---|---|---|---|
| CN | 102005647 | A | 4/2011 |
| CN | 105711108 | A | 6/2016 |
| DE | 202012002178 | U1 | 4/2012 |
| JP | 2002135030 | A | 5/2002 |
| JP | 2010030215 | A | 2/2010 |
| JP | 2011046183 | A | 3/2011 |
| JP | 5460218 | B | 4/2014 |
| JP | 2015099081 | A | 5/2015 |
| JP | 2016080479 | A | 5/2016 |
| JP | 2016182866 | A | 10/2016 |

OTHER PUBLICATIONS

Chinese Office Action Search Report assigned Application No. 201780074146.2 dated Dec. 3, 2021.
European Search Report Application No. 17887770.0 dated Jun. 15, 2020.

\* cited by examiner

RADAR COVER AND METHOD FOR MANUFACTURING RADAR COVER

CROSS-REFERENCE TO RELATED APPLICATIONS

The present application is a national phase application of the international application number PCT/JP2017/046115 filed on Dec. 22, 2017, which claims priority based on Japanese Patent Application No. 2016-252957 filed on Dec. 27, 2016 in Japan and Japanese Patent Application No. 2017-005813 filed on Jan. 17, 2017 in Japan, the contents of which are incorporated here by reference.

TECHNICAL FIELD AND BACKGROUND ART

The present invention relates to a radar cover and a method for manufacturing the radar cover. In recent years, a radar unit for detecting an obstacle or the like around a vehicle using a radio wave such as a millimeter wave has been mounted on the vehicle. Generally, a radar unit is installed in a state in which the radar unit is covered with a radar cover to which a decoration such as an emblem has been applied. Such a radar unit transmits and receives a radio wave that has passed through the radar cover. Therefore, for example, as disclosed in Patent Documents 1 and 2, of course, it is necessary to form the radar cover so as to transmit a radio wave.

Patent Document 3 discloses a radar cover in which an inner core having a metallic discontinuous film formed on a surface layer thereof is housed in a housing recess formed on a back surface of a transparent member, and a support member is bonded to the back surface of the transparent member. A radar cover having such an inner core is manufactured by integrating the inner core housed in the housing recess with the support member by injection molding. For example, Patent Document 3 discloses a method for simply manufacturing a radar cover having an emblem or the like by sandwiching a glittering member serving as a colored core between a transparent member and a support member.

PRIOR ART DOCUMENTS

Patent Documents

[Patent Document 1] Japanese Unexamined Patent Application, First Publication No. 2015-99081
[Patent Document 2] Japanese Unexamined Patent Application, First Publication No. 2016-80479
[Patent Document 3] Japanese Unexamined Patent Application, First Publication No. 2011-46183

DISCLOSURE OF INVENTION

Problems to be Solved by the Invention

By the way, in a radar cover having an inner core, by including a metallic discontinuous film on a surface layer thereof, an inner core (colored core) having a silver front surface forms a portion of an emblem or the like visually recognizable from the outside. When the position of such a colored core with respect to the transparent member is displaced from an original reference position, impression of the emblem or the like visually recognized from the outside unintentionally changes.

The present invention has been made in view of the above circumstances, and an object of the present invention is, in a radar cover having a colored core, to prevent displacement of a positional relationship between a transparent member and a colored core from a reference position and to prevent change of impression of an emblem or the like that has been applied to the radar cover.

In Patent Document 3, a radar cover is manufactured by insert molding for forming a support member on a back surface of a transparent member by injection molding in a state in which a colored core is housed in a recess formed on the back surface of the transparent member. In such a radar cover, it is necessary to make the opening shape of the recess of the transparent member slightly larger than the outer shape of the colored core in order to make it possible to house the colored core in the recess of the transparent member.

A size difference between the recess of the transparent member and the colored core is extremely small. Therefore, in general, the position of the colored core in the recess does not cause such a difference in design that can be recognized by an outside person. However, an emblem or the like of a vehicle manufacturer may include a portion that is particularly easily caught by a person's attention, such as a character or a characteristic graphic. Such a portion is often extremely important in terms of a brand image strategy of a vehicle manufacturer or the like. Therefore, in a particularly important portion, it is desirable that there is no intentional difference in design even if an expert identifies the portion. However, depending on the position of the colored core in the recess in a direction along a front surface of the transparent member, an unintentional change in design may slightly occur in an important portion, for example, an edge of a character or the like appears slightly double lines.

The present invention has been achieved in view of the above circumstances, and an object of the present invention is, in a radar cover having a colored core housed in a recess formed on a back surface of a transparent member, to further improve arrangement precision of the colored core with respect to the transparent member and to prevent an unintentional change in design in a particularly important portion of the radar cover.

Means for Solving the Problem

The present invention adopts the following configuration as a means for solving the above problems.

A radar cover according to a first aspect of the present invention is disposed on a path of a radio wave of a radar unit for detecting a surrounding situation of a vehicle, and includes, a plate-like transparent member having a housing recess recessed toward the front and formed on a back surface thereof, a colored core housed in the housing recess in a state of being in contact with a bottom surface of the housing recess, and a support member bonded to the back surface of the transparent member. In at least a portion of a region forming the housing recess when viewed from a front side of the transparent member, the depth dimension of the housing recess is set to be larger than the thickness dimension of the colored core, and a portion of the support member is filled in a region where the colored core is not disposed in a space surrounded by the housing recess.

In the first aspect, the inner wall surface of the housing recess may be bent and connected to the back surface of the transparent member.

In the first aspect, the colored core may have a discontinuous metal film disposed on a surface layer thereof and capable of transmitting the radio wave.

A method for manufacturing a radar cover according to a second aspect of the present invention is a method for manufacturing a radar cover disposed on a path of a radio wave of a radar unit for detecting a surrounding situation of a vehicle. The radar cover includes, a plate-like transparent member having a housing recess recessed toward the front and formed on a back surface thereof, a colored core housed in the housing recess in a state of being in contact with a bottom surface of the housing recess, and a support member bonded to the back surface of the transparent member. The method includes, a transparent member forming step of forming the transparent member having the housing recess in which the depth dimension is set to be larger than the thickness dimension of the colored core in at least a portion of a region forming the housing recess when viewed from a front side of the transparent member, a colored core disposing step of disposing the colored layer in the housing recess in a state of being in contact with a bottom of the housing recess, and a support member forming step of forming the support member on a back side of the transparent member by injection molding.

In the second aspect, in the transparent member forming step, the transparent member in which the inner wall surface of the housing recess is bent and connected to the back surface may be formed.

In the second aspect, in the colored core disposing step, the colored core having a discontinuous metal film capable of transmitting the radio wave on a surface layer thereof may be disposed in the housing recess.

A radar cover according to a third aspect of the present invention includes, a transparent member having a recess formed on a back surface thereof, a colored core housed in the recess, and a support member bonded to the back surface of the transparent member and supporting the transparent member. At least one of the transparent member and the colored core has a protrusion for positioning the colored core with respect to the transparent member in a direction along a front surface of the transparent member.

In the third aspect, the protrusion may be disposed on either one of a flat surface disposed on the transparent member and a flat surface disposed on the colored core.

In the third aspect, the protrusion may be formed so as to be narrowed from a root thereof toward a distal end thereof.

In the third aspect, as the protrusion, a rotation regulating protrusion for regulating movement of the colored core with respect to the transparent member in a rotation direction around an axis intersecting with a front surface of the transparent member, and a linear movement regulating protrusion for regulating movement of the colored core with respect to the transparent member in a linear direction along the front surface of the transparent member may be included.

In the third aspect, the protrusion may be formed so as to protrude in a direction along a front surface of the transparent member from an inner wall side surface of the recess.

In the third aspect, the protrusion may be formed so as to avoid the uppermost surface of the recess and the uppermost surface of the colored core.

In the third aspect, the protrusion amount of the protrusion may be 0.1 mm or less.

Effects of the Invention

In the first and second aspects of the present invention, the depth dimension of the housing recess formed on a back surface of the transparent member is set to be larger than the thickness dimension of the colored core. Therefore, even when the colored core is housed in the housing recess, the whole of the housing recess is not filled with the colored core, and there is a region where the colored core does not exist in a portion of the housing recess on a side of the support member (a region close to the support member). Furthermore, in each of the above aspects of the present invention, the support member is filled in a region where the colored core does not exist in the housing recess. According to each of the above aspects of the present invention, the entire back surface of the colored core is reliably in close contact with the support member, and the entire area of a side surface of the colored core is in contact with the housing recess. Therefore, it is possible to reliably prevent displacement of the colored core with respect to the transparent member.

Furthermore, in each of the above aspects of the present invention, in manufacturing the radar cover, the support member is formed by injection molding in a state in which the colored core is housed in the housing recess of the transparent member. At this time, the entire colored core is reliably housed inside the housing recess, and a back surface of the colored core is disposed on an inner side of a back surface of the transparent member (on a front side of the transparent member). As a result, the inner wall surface of the housing recess protrudes to a position higher than the colored core (a position protruding toward a side of the support member beyond the back surface of the colored core). When a material for forming the support member is poured into the housing recess, it is possible to reliably prevent the colored core from flowing out of the housing recess. Therefore, according to each of the above aspects of the present invention, it is possible to reliably prevent displacement of the colored core with respect to the transparent member.

Therefore, according to each of the above aspects of the present invention, in the radar cover having the colored core, it is possible to prevent displacement of a positional relationship between the transparent member and the colored core from a reference position and to prevent change of impression of an emblem or the like that has been applied to the radar cover.

Furthermore, according to the third aspect of the present invention, the protrusion formed in the transparent member or the colored core positions the colored core with respect to the transparent member in a direction along a front surface of the transparent member. Therefore, it is possible to accurately position the colored core in the recess of the transparent member. For example, it is possible to prevent an unintentional change in an important portion in the design of the radar cover. Therefore, according to the above aspects of the present invention, in the radar cover having the colored core housed in the recess formed on the back surface of the transparent member, it is possible to further improve arrangement precision of the colored core with respect to the transparent member and to prevent an unintentional change in design in a particularly important portion of the radar cover.

EMBODIMENTS FOR CARRYING OUT THE INVENTION

Hereinafter, a radar cover and a method for manufacturing the radar cover according to a first embodiment of the present invention will be described with reference to the drawings. Incidentally, in the following drawings, in order to make each member have a recognizable size, the scale of each member is appropriately changed.

Figure 1:
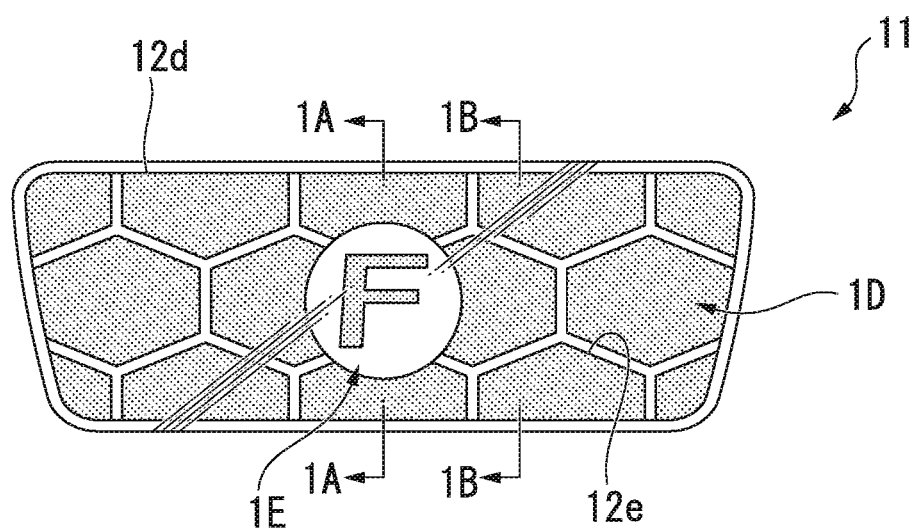
FIG. 1 is a front view schematically illustrating a radar cover according to a first embodiment of the present invention.
Figure 2A:
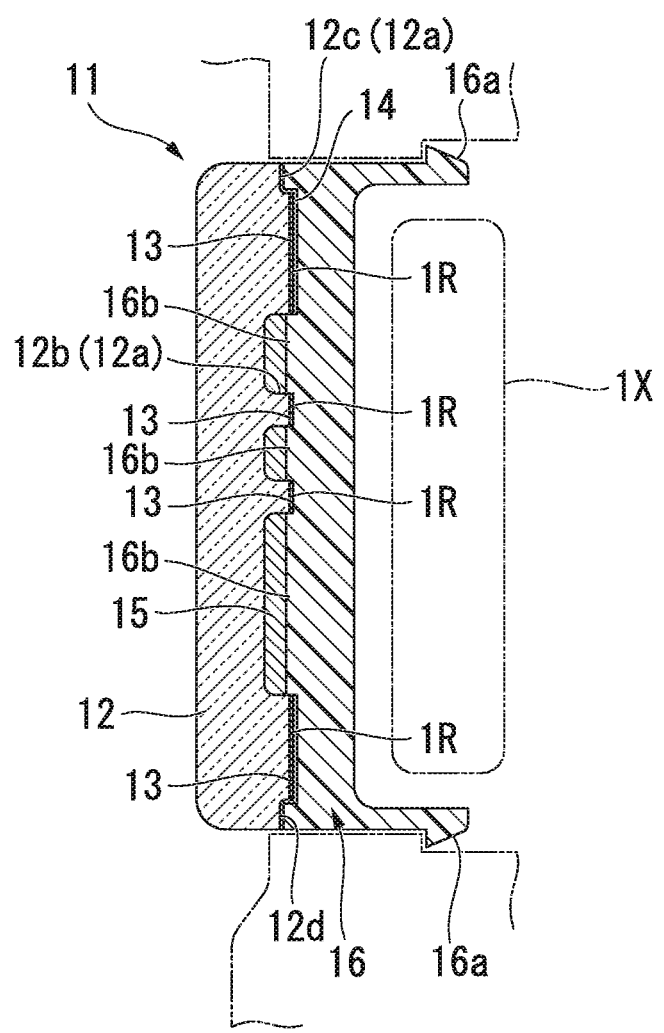
FIG. 2A is a cross-sectional view taken along line 1A-1A of FIG. 1.
Figure 2B:
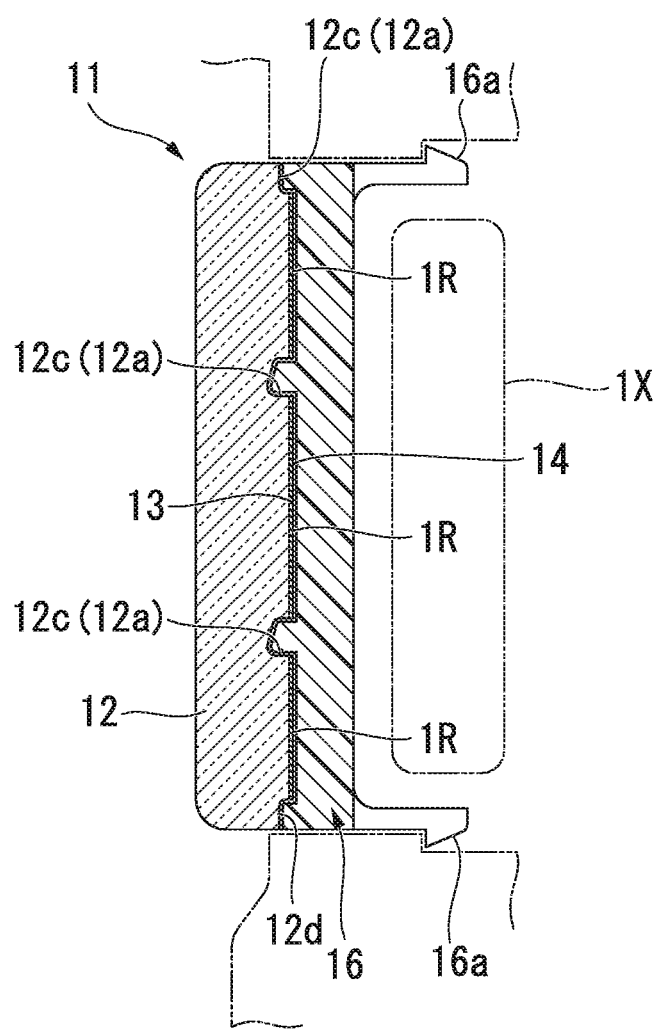
FIG. 2B is a cross-sectional view taken along line 1B-1B of FIG. 1.

FIG. 1 is a front view schematically illustrating a radar cover 11 of the present embodiment. FIG. 2A is a cross-sectional view taken along line 1A-1A of FIG. 1. FIG. 2B is a cross-sectional view taken along line 1B-1B of FIG. 1. As illustrated in FIG. 1, the radar cover 11 of the present embodiment has an emblem 1E disposed at the center and a mesh-like outer design portion 1D disposed around the emblem 1E. Incidentally, in FIG. 1, a portion of the emblem 1E and a portion of the outer design portion 1D are illustrated in white, but the region illustrated in white is silver in the present embodiment. A region indicated by a dot pattern in the emblem 1E and the outer design portion 1D is black in the present embodiment.

As illustrated in FIGS. 2A and 2B, the radar cover 11 of the present embodiment is disposed so as to cover a radar unit 1X for detecting a surrounding situation of a vehicle from a front side of the vehicle, and transmits a radio wave used in the radar unit 1X. Such a radar cover 11 of the present embodiment is disposed on a path of a radio wave of the radar unit 1X (in a region through which a radio wave emitted from the radar unit 1X is propagated), and includes a transparent member 12, a print layer 13, a paint layer 14, an inner core 15 (colored core), and a support member 16 as illustrated in FIGS. 2A and 2B. Hereinafter, the up-down direction on the sheet in FIGS. 1, 2A, and 2B is simply referred to as an up-down direction. The up-down direction is the same as the vertical direction when the radar cover 11 is installed in a vehicle.

The transparent member 12 is formed of a transparent resin material and is disposed at the outermost side of a vehicle among constituent members of the radar cover 11. A front surface of the transparent member 12 is formed in a smooth surface in order to enhance visibility of the emblem 1E and the outer design portion 1D when viewed from the outside of the vehicle. On a back side of the transparent member 12 (a side facing the support member 16, back surface), a recess 12a is formed. In the radar cover 11 of the present embodiment, the transparent member 12 includes, as the recess 12a, an inner core housing recess 12b (housing recess) having the inner core 15 housed therein, and a painted recess 12c having the paint layer 14 formed therein by application of a paint to the inner wall surface. A surface of the transparent member 12 on a side of the radar unit 1X is referred to as a back surface, and the surface opposite thereto is referred to as a front surface (front). A side on which a back surface of the transparent member 12 is located may be referred to as a back side, and a side on which a front surface thereof is located may be referred to as a front side. A direction in which the front surface and the back surface of the transparent member 12 face each other, that is, a left-right direction on the sheet in FIGS. 2A and 2B may be referred to as a thickness direction.

The inner core housing recess 12b is formed in a circular shape when viewed from the front and is disposed at the center of the radar cover 11 on which the emblem 1E is disposed. A circular outer edge of the inner core housing recess 12b is disposed avoiding the character "F" illustrated in FIG. 1, and the character "F" is located inside the circular outer edge. Such an inner core housing recess 12b houses the inner core 15 in a state in which the inner core 15 is in contact with the inner wall surface.

Figure 3:
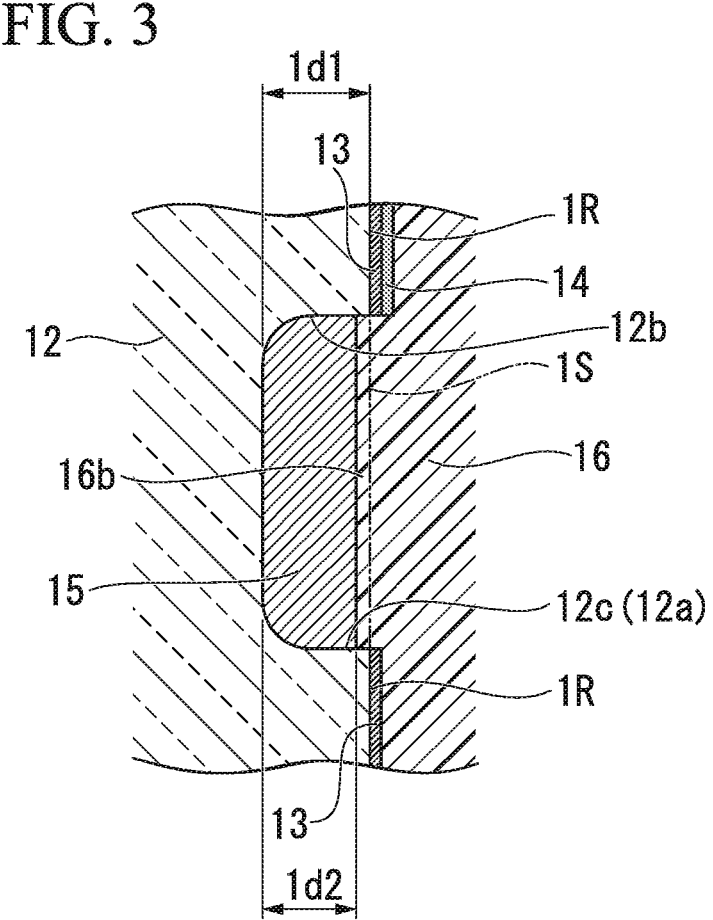
FIG. 3 is a schematic enlarged cross-sectional view including an inner core housing recess 2b included in the radar cover according to the first embodiment of the present invention.

FIG. 3 is a schematic enlarged cross-sectional view including the inner core housing recess 12b. As illustrated in FIG. 3, in the present embodiment, a depth dimension 1*d*1 of the inner core housing recess 12*b* is set to be larger than a thickness dimension 1*d*2 of the inner core 15. Note that the depth dimension 1*d*1 of the inner core housing recess 12*b* means a distance dimension from a bottom surface of the inner core housing recess 12*b* to a virtual surface 1S which is the same surface as a back surface of the transparent member 12 in a direction perpendicular to the back surface of the transparent member 12 (thickness direction). That is, the depth dimension 1*d*1 of the inner core housing recess 12*b* indicates the depth distance from the back surface of the transparent member 12 of the inner core housing recess 12*b* recessed from the back surface of the transparent member 12 toward the front of the transparent member 12. The thickness dimension 1*d*2 of the inner core 15 means a distance dimension from a surface of the transparent member 12 of the inner core 15 on a front side thereof to a surface of the transparent member 12 of the inner core 15 on a back side thereof in a direction perpendicular to the back surface of the transparent member 12 (thickness direction). That is, the thickness dimension 1*d*2 of the inner core 15 indicates the thickness of the inner core 15 formed in a plate shape.

As illustrated in FIG. 3, the inner wall surface of the inner core housing recess 12*b* is bent at an angle of approximately 90° and connected to the back surface of the transparent member 12. That is, a boundary portion (connecting portion) between the inner wall surface (side surface) of the inner core housing recess 12*b* and a print layer forming region 1R has a so-called pin angle (an angle having no roundness but a sharp edge, an angular shape). Note that the angle formed between the inner wall surface of the inner core housing recess 12*b* and the back surface of the transparent member 12 is preferably 90°, but may be about 93° in consideration of a draft during injection molding. Note that the angle may be an obtuse angle.

With reference to FIGS. 2A and 2B again, the painted recess 12*c* has, a frame-like portion 12*d* disposed in a frame shape on an outer edge portion of the radar cover 11, and a mesh-like portion 12*e* formed in a mesh shape inside the frame-like portion 12*d*, when viewed from the front. In such a painted recess 12*c*, the paint layer 14 is disposed so as to cover the inner wall surface of the painted recess 12*c*. A portion of the support member 16 enters the painted recess 12*c*, and the paint layer 14 is covered from the back side by the support member 16.

In the present embodiment, a region in which the recess 12*a* is not formed on a surface of the transparent member 12 on a side of the support member 16 is the print layer forming region 1R where the print layer 13 is formed. This print layer forming region 1R is a flat surface and is covered from the back side of the transparent member 12 by the print layer 13.

Such a transparent member 12 is formed of a transparent synthetic resin such as colorless polycarbonate (PC) or a polymethyl methacrylate resin (PMMA), for example, and has a thickness of about 1.5 mm to 10 mm. A front surface of the transparent member 12 may be subjected to a hard coat treatment for preventing scratches or a clear coat treatment with a urethane-based paint as necessary. Incidentally, if a material of the transparent member 12 is a transparent synthetic resin having scratch resistance, the scratch preventing treatment is not necessary.

The print layer 13 is a thin film layer printed on the print layer forming region 1R of the transparent member 12 and is black as described above in the present embodiment. The print layer 13 is formed by transferring black ink onto the print layer forming region 1R and drying the ink. The print layer 13 can be formed by putting a black resin ink capable of transmitting a radio wave used in the radar unit 1X on the print layer forming region 1R, for example, by a silk printing method and drying the ink naturally. Such a print layer 13 is visually recognizable from the outside through the transparent member 12 and forms a region indicated by the dot pattern illustrated in FIG. 1.

The paint layer 14 is a thin film layer formed by drying a silver paint capable of transmitting a radio wave used in the radar unit 1X and is silver as described above in the present embodiment.

As illustrated in FIGS. 2A and 2B, the paint layer 14 is disposed on the entire back surface of the transparent member 12 on which the print layer 13 is formed except for a region where the emblem 1E is formed. That is, the paint layer 14 covers a surface (surface facing the support member 16) of the print layer 13 on a side of the support member 16 except for the region where the emblem 1E is formed. The paint layer 14 can be formed, for example, by applying a paint containing a pearl pigment and drying the paint naturally. Such a paint layer 14 is visually recognizable from the outside through the transparent member 12 in the painted recess 12*c* and forms a region indicated by white of the outer design portion 1D illustrated in FIG. 1.

The inner core 15 has, a base formed of a resin capable of transmitting a radio wave used in the radar unit 1X, and a glittering film formed so as to cover a front surface of the base. Examples of the glittering film include a discontinuous metal film having many gaps (holes) capable of transmitting a radio wave formed therein, and examples thereof include an indium film formed by a sputtering method or a vacuum vapor deposition method. That is, the inner core 15 has a discontinuous metal film disposed on a surface layer thereof and capable of transmitting a radio wave. By having such a discontinuous metal film, the inner core 15 is silver. Note that the inner core 15 may have a transparent top coat layer covering a front surface of the glittering film or an undercoat layer covering a back surface of the glittering film. Such an inner core 15 is fitted and disposed in the inner core housing recess 12*b* of the transparent member 12 such that the glittering film of the inner core 15 faces the inner wall surface of the inner core housing recess 12*b*. Such an inner core 15 is visually recognizable from the outside through the transparent member 12 and forms a region indicated by white of the emblem 1E illustrated in FIG. 1. The front surface of the inner core 15 is in contact with a bottom surface (front inner surface) of the inner core housing recess 12*b*.

As described above, the thickness dimension 1*d*2 of the inner core 15 is set to be smaller than the depth 1*d*1 of the inner core housing recess 12*b*. Therefore, when the transparent member 12 and the inner core 15 are viewed as an integrated body (integrated structure), a recess is formed on a back surface of the integrated body.

The support member 16 is a portion bonded to the back surface of the transparent member 12 and supporting the transparent member 12, and is formed of a black resin material. The support member 16 has an engaging portion 16*a* protruding toward a side of an engine room. The engaging portion 16*a* has a claw-shaped distal end portion, and the distal end portion is engaged, for example, with a radiator grill main body. In the present embodiment, the support member 16 has a protrusion 16*b* housed in the inner core housing recess 12*b* and bonded to the back surface of the inner core 15. That is, in the radar cover 11 of the present embodiment, the protrusion 16*b* which is a portion of the support member 16 is filled in a region where the inner core 15 is not disposed (region from the inner core 15 to the virtual surface 1S illustrated in FIG. 3) out of a space surrounded by the inner core housing recess 12b of the transparent member 12. In the present embodiment, the protrusion 16b is located on the opposite side to the bottom surface of the inner core housing recess 12b with the inner core 15 interposed therebetween.

Incidentally, in the present embodiment, in the entire region forming the inner core housing recess 12b when viewed from the front side of the transparent member 12, a region where the inner core 15 is not disposed out of a space surrounded by the inner core housing recess 12b is formed. Therefore, in the present embodiment, the protrusion 16b of the support member 16 is formed in the entire region forming the inner core housing recess 12b when viewed from the front side of the transparent member 12. Therefore, the protrusion 16b of the support member 16 is connected to the inner wall surface of the inner core housing recess 12b over the entire region in a circumferential direction thereof.

Such a support member 16 is formed of a synthetic resin such as an acrylonitrile/butadiene/styrene copolymer synthetic resin (ABS), an acrylonitrile/ethylene/styrene copolymer synthetic resin (AES), acrylonitrile/styrene/acrylate (ASA), polybutylene terephthalate (PBT), a colored PC, or polyethylene terephthalate (PET), or a composite resin thereof, and has a thickness of about 1.0 mm to 10 mm.

Subsequently, a method for manufacturing the radar cover 11 of the present embodiment will be described with reference to FIGS. 4 to 8.

Figure 4A:
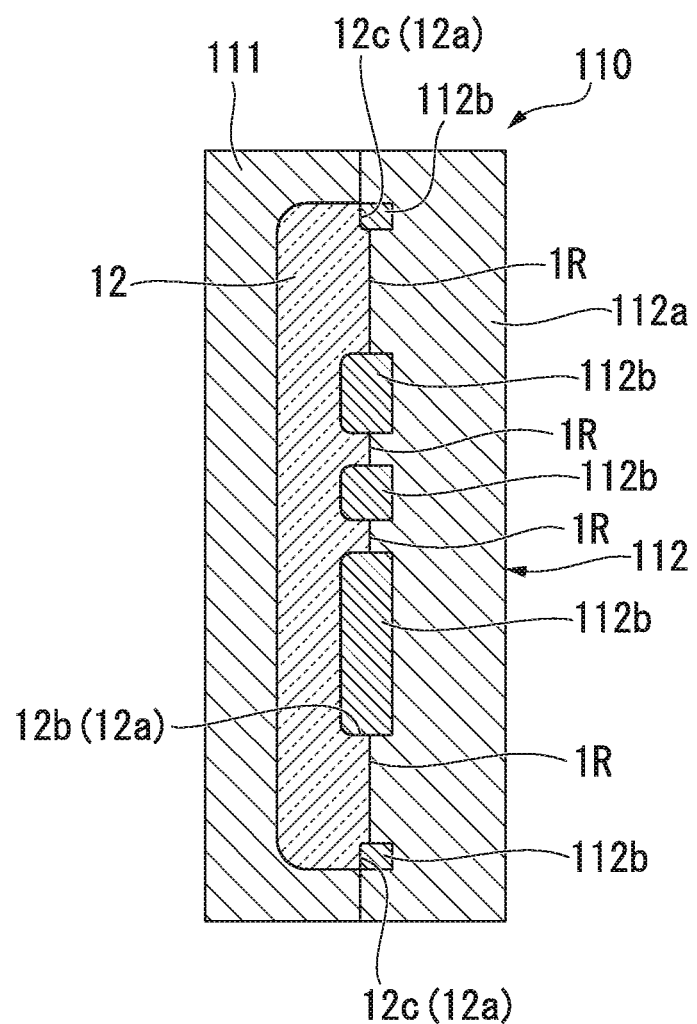
FIG. 4A is a schematic view for explaining a method for manufacturing the radar cover according to the first embodiment of the present invention.
Figure 4B:
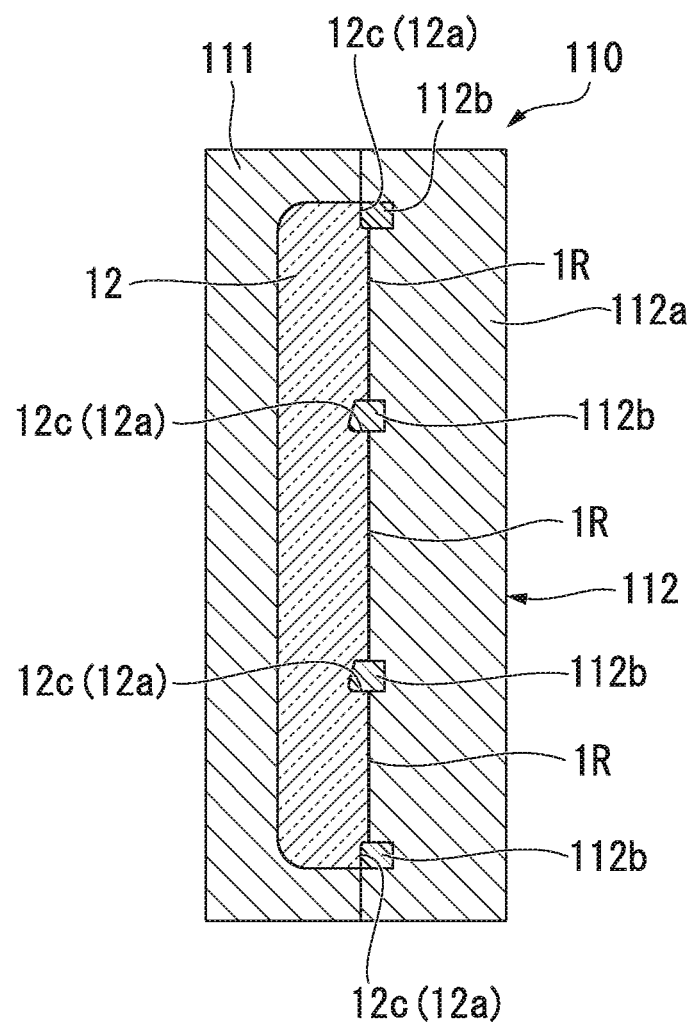
FIG. 4B is a schematic view for explaining the method for manufacturing the radar cover according to the first embodiment of the present invention.

First, as illustrated in FIGS. 4A and 4B, the transparent member 12 is formed. Note that FIG. 4A is a cross-sectional view at the same position as FIG. 2A, and FIG. 4B is a cross-sectional view at the same position as FIG. 2B. Here, the transparent member 12 is formed by injection molding using a die 110. The die 110 has a fixed side cavity die 111 and a moving side core die 112. Furthermore, in the present embodiment, the core die 112 has, a base 112a forming the print layer forming region 1R, and a nest 112b for forming the recess 12a. The nest 112b is separated from the base 112a of the core die 112 and protrudes from a front surface of the base 112a toward a side of the cavity die 111 in a state of being fixed to the base 112a. By disposing the nest 112b in the core die 112 as described above, a front surface of the base 112a and a front surface of the nest 112b can be bent and connected to each other to form the transparent member 12 in which the print layer forming region 1R and the inner wall surface of the recess 12a are bent and connected to each other.

In the radar cover 11 of the present embodiment, as described above, the depth dimension 1d1 of the inner core housing recess 12b of the transparent member 12 is set to be larger than the thickness dimension 1d2 of the inner core 15 (see FIG. 3). That is, such a step illustrated in FIG. 4 corresponds to a transparent member forming step of forming the transparent member 12 having the inner core housing recess 12b in which the depth dimension 1d1 is set to be larger than the thickness dimension 1d2 of the inner core 15.

Figure 5A:
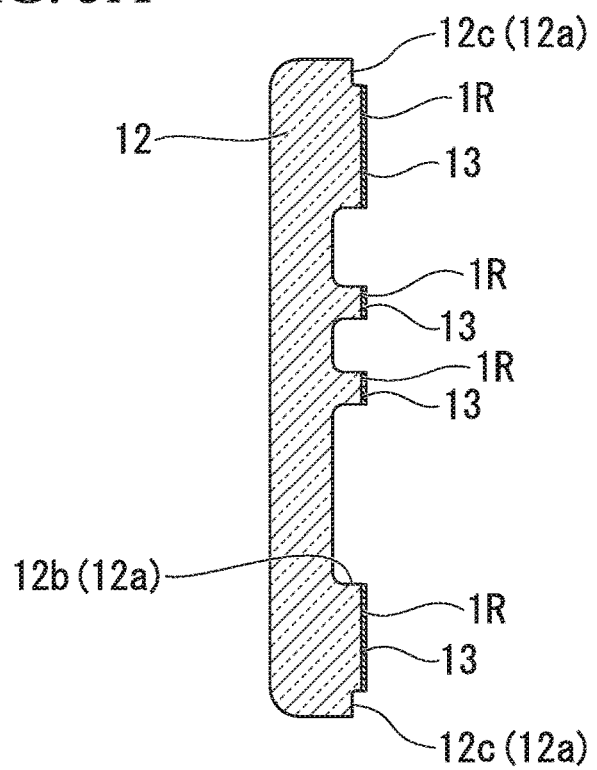
FIG. 5A is a schematic view for explaining the method for manufacturing the radar cover according to the first embodiment of the present invention.
Figure 5B:
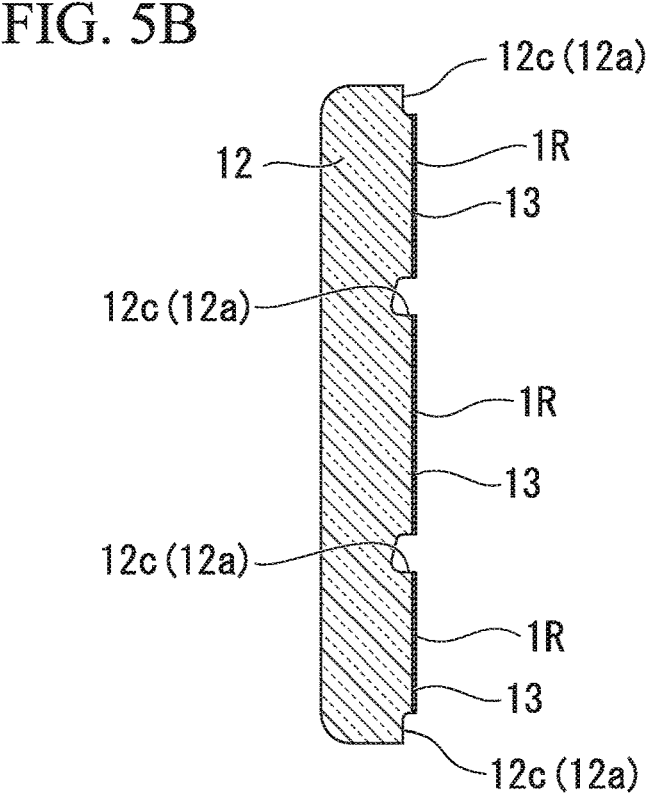
FIG. 5B is a schematic view for explaining the method for manufacturing the radar cover according to the first embodiment of the present invention.

Subsequently, as illustrated in FIGS. 5A and 5B, the print layer 13 is formed. Note that FIG. 5A is a cross-sectional view at the same position as FIG. 2A, and FIG. 5B is a cross-sectional view at the same position as FIG. 2B. Here, the print layer 13 is formed by transferring ink onto the print layer forming region 1R which is a region except for the recess 12a of the transparent member 12 by a printing method such as a silk printing method and drying the ink. At this time, in the radar cover 11 of the present embodiment, the print layer forming region 1R and the inner wall surface of the recess 12a are bent and connected to each other.

Therefore, the ink transferred onto the print layer forming region 1R has more difficulty in moving to the inner wall surface of the recess 12a than a case where the print layer forming region 1R and the inner wall surface of the recess 12a are connected with a smooth curved surface. According to such a method for manufacturing the radar cover 11 of the present embodiment, it is possible to prevent unintentional meandering of an end portion of the print layer 13.

Figure 6A:
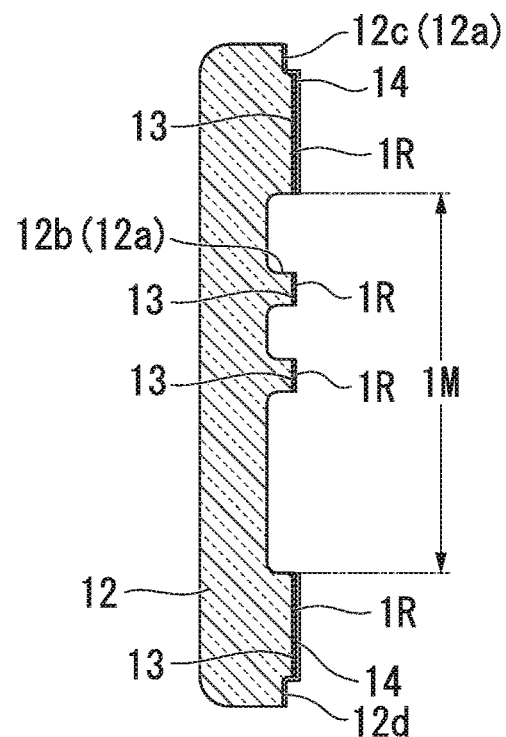
FIG. 6A is a schematic view for explaining the method for manufacturing the radar cover according to the first embodiment of the present invention.
Figure 6B:
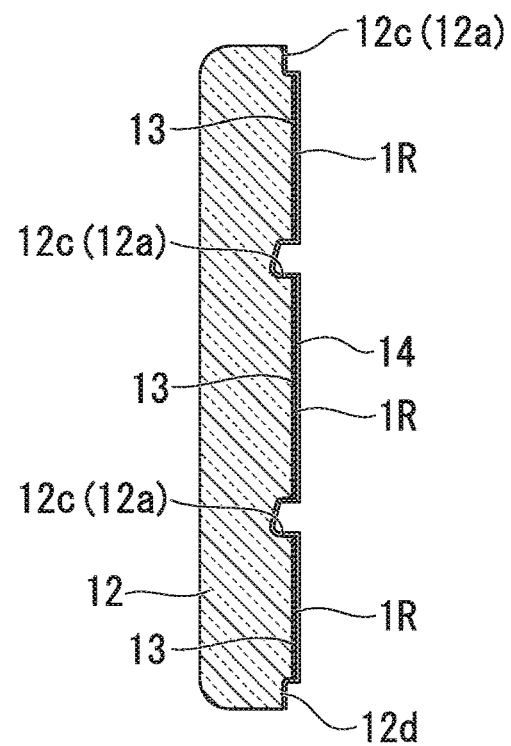
FIG. 6B is a schematic view for explaining the method for manufacturing the radar cover according to the first embodiment of the present invention.

Subsequently, as illustrated in FIGS. 6A and 6B, the paint layer 14 is formed. Note that FIG. 6A is a cross-sectional view at the same position as FIG. 2A, and FIG. 6B is a cross-sectional view at the same position as FIG. 2B. Here, in a state in which a region 1M where the emblem 1E illustrated in FIG. 6A is formed is masked, a silver mica paint is sprayed, for example, on a back side of the transparent member 12 on which the print layer 13 is formed, and the mica paint is dried to form the paint layer 14. In this way, the paint layer 14 covering the print layer 13 and directly adhering to the inner wall surface of the entire painted recess 12c is formed except for the region where the emblem 1E is formed.

Figure 7:
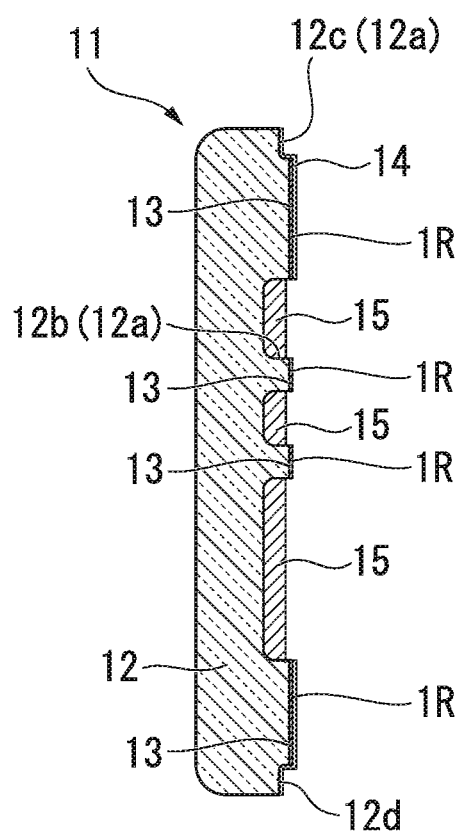
FIG. 7 is a schematic view for explaining the method for manufacturing the radar cover according to the first embodiment of the present invention.

Subsequently, as illustrated in FIG. 7, the inner core 15 is housed in the inner core housing recess 12b. Note that FIG. 7 is a cross-sectional view at the same position as FIG. 2A. Here, the inner core 15 formed in parallel to formation of the above-described transparent member 12, print layer 13, or paint layer 14 is housed in the inner core housing recess 12b. The inner core 15 is formed by forming a glittering discontinuous metal film such as an indium layer on a base formed by injection molding in advance by a vacuum vapor deposition method, a sputtering method, or the like. Note that a topcoat layer or an undercoat layer is formed as necessary in the inner core 15. Such an inner core 15 is housed in the inner core housing recess 12b with the glittering discontinuous metal film facing a side of the inner wall surface of the inner core housing recess 12b in a state of being in contact with a bottom of the inner core housing recess 12b. Such a step illustrated in FIG. 7 disposes the inner core 15 in a state of being in contact with the bottom of the inner core housing recess 12b, corresponding to the colored core disposing step in the present embodiment.

Incidentally, as described above, in the radar cover 11 of the present embodiment, the depth dimension 1d1 of the inner core housing recess 12b of the transparent member 12 is set to be larger than the thickness dimension 1d2 of the inner core 15 (see FIG. 3). Therefore, when the inner core 15 is housed in the inner core housing recess 12b, the region from the back surface of the inner core 15 to the virtual surface 1S illustrated in FIG. 3 is a space where the inner core 15 does not exist.

Figure 8A:
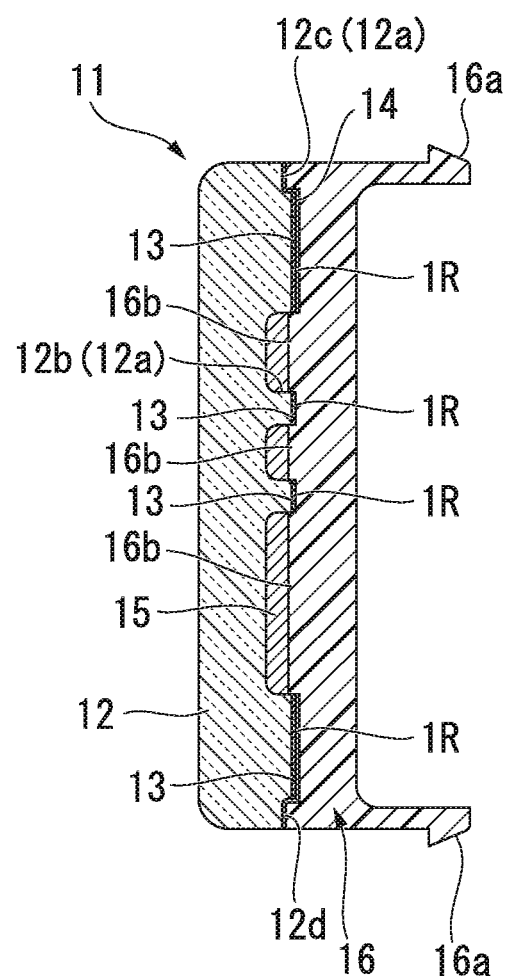
FIG. 8A is a schematic view for explaining the method for manufacturing the radar cover according to the first embodiment of the present invention.
Figure 8B:
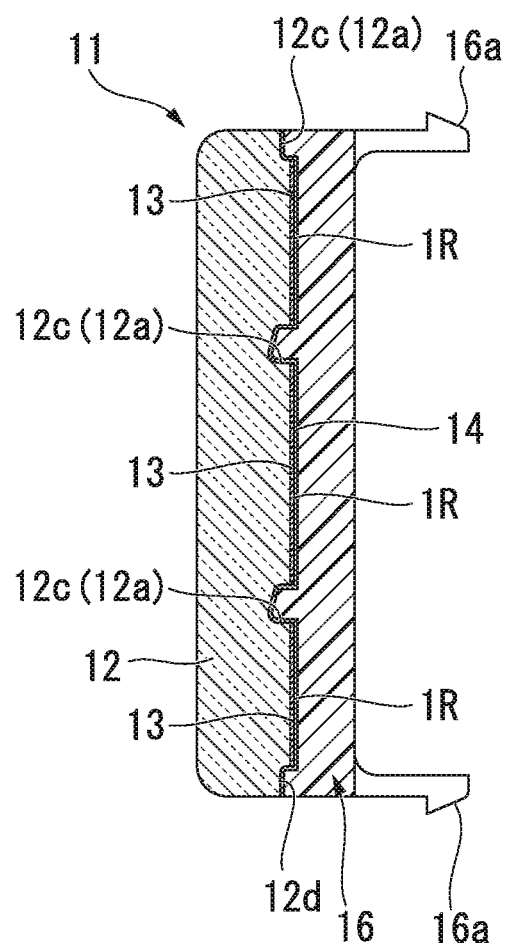
FIG. 8B is a schematic view for explaining the method for manufacturing the radar cover according to the first embodiment of the present invention.

Subsequently, as illustrated in FIGS. 8A and 8B, the support member 16 is formed. Note that FIG. 8A is a cross-sectional view at the same position as FIG. 2A, and FIG. 8B is a cross-sectional view at the same position as FIG. 2B. Here, the transparent member 12 having the inner core 15 disposed in the inner core housing recess 12b is disposed inside a die for injection molding, and insert molding for emitting a molten resin to the back side of the transparent member 12 is performed to form the support member 16. Such a support member 16 is welded to the transparent member 12 by heat during insert molding and disposed so as to cover the inner core 15. As a result, the inner core 15 is fixed to the transparent member 12.

At this time, the inner wall surface of the inner core housing recess 12b protrudes beyond the back surface of the inner core 15, and it is possible to prevent the inner core 15 from flowing out of the inner core housing recess 12b when a material for forming the support member 16 is poured into the inner core housing recess 12*b*. Note that the molten resin flows into and fills a region where the inner core 15 does not exist out of a space surrounded by the inner core housing recess 12*b*, and this portion is cooled to form the protrusion 16*b*. Such a step illustrated in FIGS. 8A and 8B forms the support member 16 on the back side of the transparent member 12 by injection molding, corresponding to the support member forming step in the present embodiment.

In the radar cover 11 of the present embodiment as described above, the depth dimension 1*d*1 of the inner core housing recess 12*b* formed on the back side of the transparent member 12 is set to be larger than the thickness dimension 1*d*2 of the inner core 15. Therefore, even when the inner core 15 is housed in the inner core housing recess 12*b*, not the whole of the inner core housing recess 12*b* is filled with the inner core 15, and there is a region where the inner core 15 does not exist in a portion of the inner core housing recess 12*b* on a side of the support member 16. Furthermore, in the radar cover 11 of the present embodiment, the support member 16 is filled in a region where the inner core 15 does not exist in the inner core housing recess 12*b*. According to such a radar cover 11 of the present embodiment, the entire back surface of the inner core 15 is reliably in close contact with the support member 16, and the entire area of a side surface of the inner core 15 is in contact with the inner wall surface of the inner core housing recess 12*b*. Therefore, it is possible to reliably prevent displacement of the inner core 15 with respect to the transparent member 12. In the radar cover 11 of the present embodiment, the protrusion 16*b* of the support member 16 enters the inner core housing recess 12*b*. Therefore, a coupling force between the transparent member 12 and the support member 16 is enhanced, and separation of the transparent member 12 from the support member 16 can be suppressed.

In the method for manufacturing the radar cover 11 of the present embodiment, the support member 16 is formed by injection molding in a state where the inner core 15 is housed in the inner core housing recess 12*b* of the transparent member 12. At this time, the entire inner core 15 is reliably housed inside the inner core housing recess 12*b*, and the back surface of the inner core 15 is disposed on an inner side of a back surface of the transparent member 12 (on a front side of the transparent member 12). As a result, the inner wall surface of the inner core housing recess 12*b* protrudes beyond the back surface of the inner core 15, and it is possible to reliably prevent the inner core 15 from flowing out of the inner core housing recess 12*b* when a material for forming the support member 16 is poured into the inner core housing recess 12*b*. Therefore, according to the method for manufacturing the radar cover 11 of the present embodiment, it is possible to reliably prevent displacement of the inner core 15 with respect to the transparent member 12.

In the radar cover 11 and the method for manufacturing the radar cover 11 according to the present embodiment, the inner wall surface of the inner core housing recess 12*b* is bent and connected to the back surface of the transparent member 12. This makes it possible to more reliably prevent the inner core 15 from flowing out of the inner core housing recess 12*b* as compared with a case where the inner wall surface of the inner core housing recess 12*b* is curved and smoothly connected to the back surface of the transparent member 12.

In the radar cover 11 and the method for manufacturing the radar cover 11 according to the present embodiment, it is possible to reliably prevent displacement of the inner core 15 with respect to the transparent member 12 as described above. Therefore, when a discontinuous metal film capable of transmitting a radio wave is formed on a surface layer of the inner core 15, it is possible to prevent the discontinuous metal film from being rubbed against the inner wall surface of the transparent member 12 to be scratched.

Hitherto, the preferred embodiment of the present invention has been described with reference to the attached drawings, but the present invention is not limited to the above embodiment. The shapes, the combinations, and the like of the respective constituent members described in the above embodiment are merely examples, and various modifications can be made based on design requirement or the like without departing from the gist of the present invention.

For example, in the above embodiment, in the entire region forming the inner core housing recess 12*b* when viewed from the front side of the transparent member 12, a region where the inner core 15 is not disposed out of a space surrounded by the inner core housing recess 12*b* is formed. However, the present invention is not limited thereto, and can also adopt a configuration in which in only a portion of the region forming the inner core housing recess 12*b* when viewed from the front side of the transparent member 12, a region where the inner core 15 is not disposed out of a space surrounded by the inner core housing recess 12*b* is formed.

Hereinafter, a radar cover according to a second embodiment of the present invention will be described with reference to the drawings. Incidentally, in the following drawings, in order to make each member have a recognizable size, the scale of each member is appropriately changed.

Figure 9:
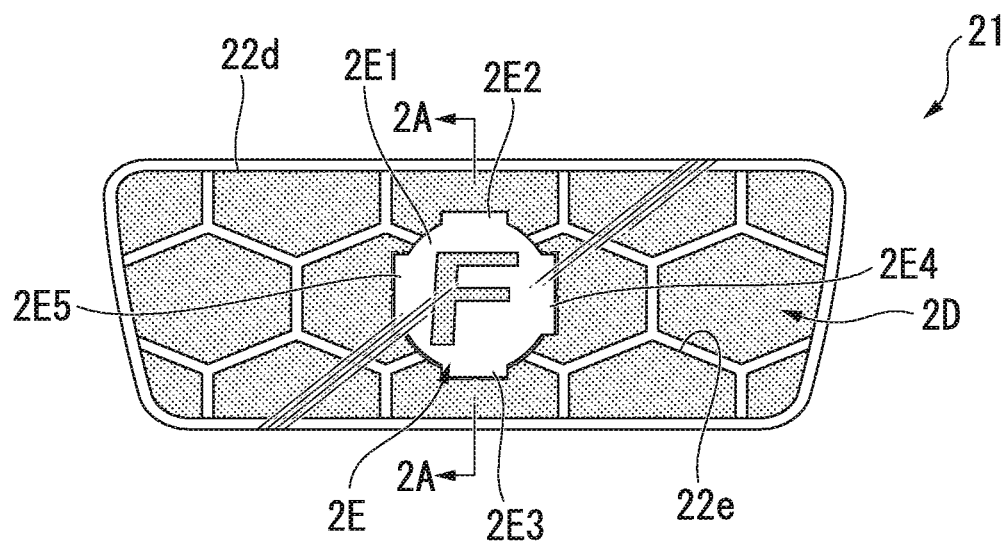
FIG. 9 is a front view schematically illustrating a radar cover according to a second embodiment of the present invention.
Figure 10:
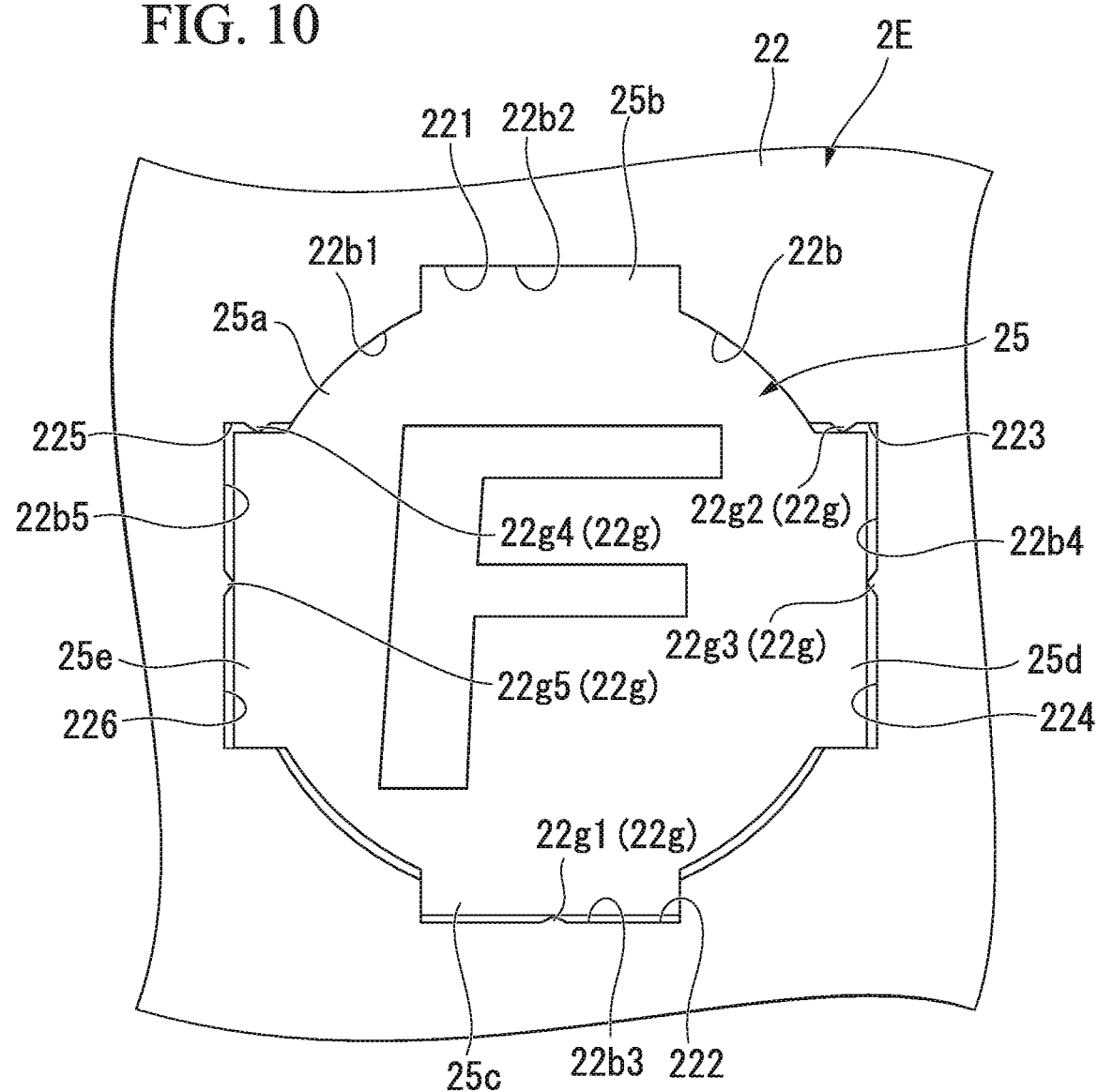
FIG. 10 is a partially enlarged view of a transparent member and an inner core included in the radar cover according to the second embodiment of the present invention.
Figure 11:
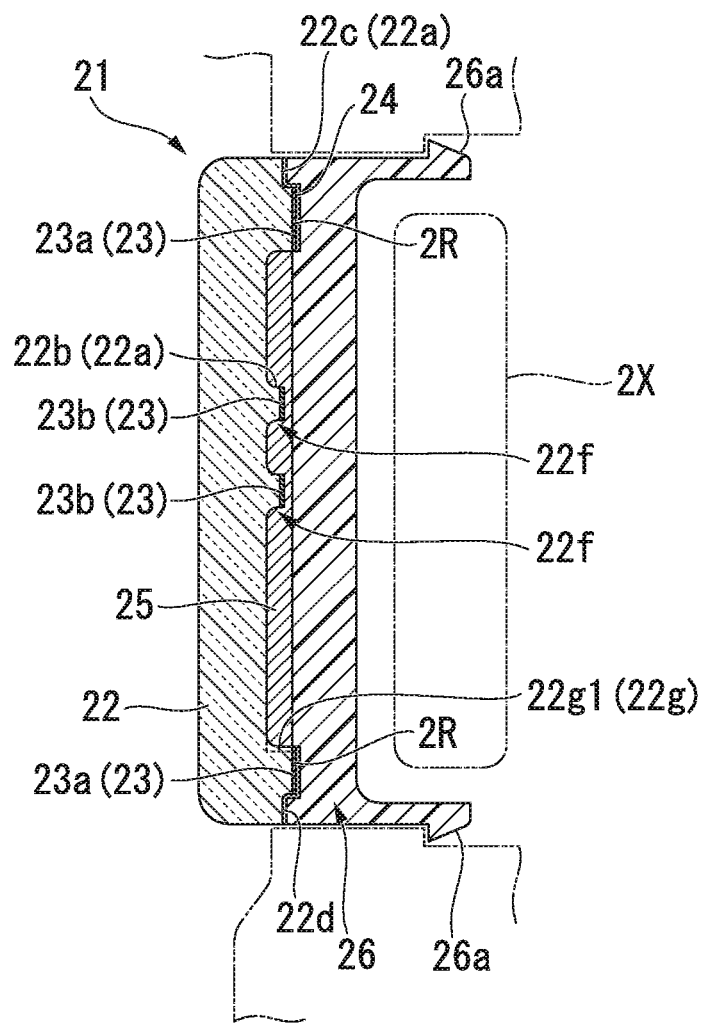
FIG. 11 is a cross-sectional view taken along line 2A-2A of FIG. 9.

FIG. 9 is a front view schematically illustrating a radar cover 21 of the present embodiment. FIG. 10 is a partially enlarged view of the transparent member 22 and the inner core 25. Incidentally, in FIG. 10, the inner core housing recess 22*b* described later is indicated by a solid line, and the painted recess 22*c* described later is omitted. FIG. 11 is a cross-sectional view taken along line 2A-2A of FIG. 9. As illustrated in FIG. 9, the radar cover 21 of the present embodiment has, an emblem 2E disposed at the center, and a mesh-like outer design portion 2D disposed around the emblem 2E. Incidentally, in FIG. 9, a portion of the emblem 2E and a portion of the outer design portion 2D are illustrated in white, but the region illustrated in white is silver in the present embodiment. A region indicated by a dot pattern in the emblem 2E and the outer design portion 2D is black in the present embodiment.

As illustrated in FIG. 11, the radar cover 21 of the present embodiment is disposed so as to cover a radar unit 2X for detecting a surrounding situation of a vehicle from a front side of the vehicle, and transmits a radio wave used in the radar unit 2X. Such a radar cover 21 of the present embodiment is disposed on a travelling path of a radio wave of the radar unit 2X (in a region through which a radio wave emitted from the radar unit 2X is propagated), and includes, a transparent member 22, a print layer 23, a paint layer 24, an inner core 25 (colored core), and a support member 26 as illustrated in FIG. 11. Hereinafter, the up-down direction on the sheet in FIGS. 9, 10, and 11 is simply referred to as an up-down direction. The up-down direction is the same as the vertical direction when the radar cover 21 is installed in a vehicle.

The transparent member 22 is formed of a transparent resin material and is disposed at the outermost side of a vehicle among constituent members of the radar cover 21. A front surface of the transparent member 22 is formed in a smooth surface in order to enhance visibility of the emblem 2E and the outer design portion 2D as viewed from the outside of the vehicle. On a back surface of the transparent member 22 (a surface on a side of the support member 26), a recess 22a is formed. In the radar cover 21 of the present embodiment, the transparent member 22 includes, as the recess 22a, an inner core housing recess 22b having the inner core 25 housed therein, and a painted recess 22c having the paint layer 24 formed therein by application of a paint to the inner wall surface. A surface of the transparent member 22 on a side of the radar unit 2X is referred to as a back surface, and the surface opposite thereto is referred to as a front surface (front). A side on which a back surface of the transparent member 22 is located may be referred to as a back side, and a side on which a front surface thereof is located may be referred to as a front side. A direction in which the front surface and the back surface of the transparent member 22 face each other, that is, a left-right direction on the sheet in FIG. 11 may be referred to as a thickness direction.

The inner core housing recess 22b is formed in a shape along the outer shape of the emblem 2E when viewed from the front and is formed at the center of the radar cover 21 on which the emblem 2E is disposed. The opening shape of the inner core housing recess 22b is slightly larger than the outer shape of the inner core 25 in order to make it possible to house the inner core 25 therein.

The painted recess 22c has, a frame-like portion 22d formed in a frame shape on an outer edge portion of the radar cover 21, and a mesh-like portion 22e formed in a mesh shape inside the frame-like portion 22d, when viewed from the front. In such a painted recess 22c, the paint layer 24 is disposed so as to cover the inner wall surface. Part of the support member 26 enters the painted recess 22c, and the paint layer 24 is covered from the back side by the support member 26.

In the present embodiment, a region in which the recess 22a is not formed on a surface (back surface) of the transparent member 22 on a side of the support member 26 is the print layer forming region 2R where the print layer 23 is formed. This print layer forming region 2R is a flat surface and is covered from the back side of the transparent member 22 by the print layer 23.

The transparent member 22 has a protrusion 22f protruding from a bottom of the inner core housing recess 22b. The protrusion 22f is erected on the bottom of the inner core housing recess 22b so as to protrude from the front side of the transparent member 22 to the back side thereof. The distal end surface of the protrusion 22f is a flat surface and is formed so as to be a print layer forming surface on which the print layer 23 is formed. Note that the distal end surface of the protrusion 22f is closer to the front side of the transparent member 22 than the print layer forming region 2R which is the back surface of the transparent member 22 (closer to the front). That is, the protrusion dimension of the inner core housing recess 22b of the protrusion 22f from the bottom is set to be smaller than the depth dimension of the inner core housing recess 22b.

In the radar cover 21 of the present embodiment, the transparent member 22 has a plurality of protrusions 22g formed on the inner wall surface of the recess 22a as illustrated in FIG. 10. These protrusions 22g are configured to position the inner core 25 in the inner core housing recess 22b. Details of these protrusions 22g will be described later in detail.

Such a transparent member 22 is formed of a transparent synthetic resin such as colorless polycarbonate (PC) or a polymethyl methacrylate resin (PMMA), for example, and has a thickness of about 1.5 mm to 10 mm. A front surface of the transparent member 22 may be subjected to a hard coat treatment for preventing scratches or a clear coat treatment with a urethane-based paint as necessary. Incidentally, if a material of the transparent member 22 is a transparent synthetic resin having scratch resistance, the scratch preventing treatment is not necessary.

The print layer 23 is a thin film layer printed on the print layer forming region 2R of the transparent member 22 and the distal end surface of the protrusion 22f and is black as described above in the present embodiment. The print layer 23 is formed by transferring a black ink onto the print layer forming region 2R or the distal end surface of the protrusion 22f and drying the ink. The print layer 23 formed on the print layer forming region 2R (back surface) of the transparent member 22 (hereinafter referred to as an outer print layer 23a) can be formed by putting a black resin ink capable of transmitting a radio wave used in the radar unit 2X on the print layer forming region 2R, for example, by a silk printing method and drying the ink naturally. The print layer 23 formed on the distal end surface of the protrusion 22f (hereinafter referred to as an emblem print layer 23b) can be formed by putting a black resin ink capable of transmitting a radio wave used in the radar unit X on the distal end surface of the protrusion 22f, for example, by a pad printing method and drying the ink naturally.

The outer print layer 23a and the emblem print layer 23b are visually recognizable from the outside through the transparent member 22 and form a region indicated by the dot pattern illustrated in FIG. 9. For example, the outer print layer 23a forms a portion excluding the mesh-like pattern of the outer design portion 2D. The emblem print layer 23b forms a character portion of "F" of the emblem 2E.

The paint layer 24 is a thin film layer formed by drying a silver paint capable of transmitting a radio wave used in the radar unit 2X and is silver as described above in the present embodiment.

The paint layer 24 is disposed on the entire back surface of the transparent member 22 on which the print layer 23 is formed except for a region where the emblem 2E is formed. That is, the paint layer 24 covers a surface (surface facing the support member 26) of the print layer 23 on a side of the support member 26 except for the region where the emblem 2E is formed. The paint layer 24 can be formed, for example, by applying a paint containing a pearl pigment and drying the paint naturally. Such a paint layer 24 is visually recognizable from the outside through the transparent member 22 in the painted recess 22c and forms a region indicated by white of the outer design portion 2D illustrated in FIG. 9.

The inner core 25 has, a base formed of a resin capable of transmitting a radio wave used in the radar unit 2X, and a glittering film formed so as to cover a front surface of the base. Examples of the glittering film include a discontinuous metal film having many gaps (holes) capable of transmitting a radio wave formed therein, and examples thereof include an indium film formed by a sputtering method or a vacuum vapor deposition method. That is, the inner core 25 has a discontinuous metal film disposed on a surface layer thereof and capable of transmitting a radio wave. By having such a discontinuous metal film, the inner core 25 is silver. Note that the inner core 25 may have a transparent top coat layer covering a front surface of the glittering film or an undercoat layer covering a back surface of the glittering film. The inner core 25 has a groove corresponding to the protrusion 22f of the transparent member 22. The inner core 25 is fitted and disposed in the inner core housing recess 22b of the transparent member 22 such that the glittering film of the inner core 25 faces the inner wall surface of the inner core housing recess 22b and furthermore the protrusion 22f is fitted into the groove. Such an inner core 25 is visually recognizable from the outside through the transparent member 22 and forms a region indicated by white of the emblem 2E illustrated in FIG. 9.

The support member 26 is a portion bonded to the back surface of the transparent member 22 and supporting the transparent member 22, and is formed of a black resin material. The support member 26 has an engaging portion 26a protruding toward a side of an engine room. The engaging portion 26a has a claw-shaped distal end portion, and the distal end portion is engaged, for example, with a radiator grill main body. Such a support member 26 is formed of a synthetic resin such as an acrylonitrile/butadiene/styrene copolymer synthetic resin (ABS), an acrylonitrile/ethylene/styrene copolymer synthetic resin (AES), acrylonitrile/styrene/acrylate (ASA), polybutylene terephthalate (PBT), a colored PC, or polyethylene terephthalate (PET), or a composite resin thereof, and has a thickness of about 1.0 mm to 10 mm.

Subsequently, with reference to FIGS. 9 and 10, the protrusion 22g included in the transparent member 22 will be described. In the present embodiment, as illustrated in FIG. 9, the emblem 2E is formed into a shape having, a circular central portion 2E1, an upper protrusion 2E2 protruding upward from the central portion 2E1 and having a linear upper edge and a linear side edge, a lower protrusion 2E3 protruding downward from the central portion 2E1 and having a linear lower edge and a linear side edge, a right protrusion 2E4 protruding to the right from the central portion 2E1 and having a linear right edge and linear upper and lower edges, and a left protrusion 2E5 protruding to the left from the central portion 2E1 and having a linear left edge and linear upper and lower edges, when viewed from the front side (when viewed from the thickness direction) The shapes of the inner core 25 and the inner core housing recess 22b of the transparent member 22 are set according to the shape of such an emblem 2E.

That is, as illustrated in FIG. 10, the inner core 25 is formed into a shape having, a disk-like central plate portion 25a, an upper plate portion 25b protruding upward from the central plate portion 25a and having a flat upper end surface and a flat side end surface, a lower plate portion 25c protruding downward from the central plate portion 25a and having a flat lower end surface and a flat side end surface, a right plate portion 25d protruding to the right from the central plate portion 25a and having a flat right end surface and flat upper and lower end surfaces, and a left plate portion 25e protruding to the left from the central plate portion 25a and having a flat left end surface and flat upper and lower end surfaces. In the present embodiment, the upper end surface and the side end surface of the upper plate portion 25b, the lower end surface and the side end surface of the lower plate portion 25c, the right end surface and the upper and lower end surfaces of the right plate portion 25d, and the left end surface and the upper and lower end surfaces of the left plate portion 25e are parallel to a thickness direction. Note that these surfaces may be inclined with respect to the thickness direction.

Note that a groove corresponding to the protrusion 22f of the transparent member 22 for forming the character "F" of the emblem 2E is formed in the central plate portion 25a of the inner core 25.

The inner core housing recess 22b of the transparent member 22 is formed into a shape having, a central recess 22b1 in which the central plate portion 25a of the inner core 25 is housed, an upper recess 22b2 in which the upper plate portion 25b of the inner core 25 is housed, a lower recess 22b3 in which the lower plate portion 25c of the inner core 25 is housed, a right recess 22b4 in which the right plate portion 25d of the inner core 25 is housed, and a left recess 22b5 in which the left plate portion 25e of the inner core 25 is housed.

The upper recess 22b2 has a flat upper wall surface 221 facing an upper end surface of the upper plate portion 25b of the inner core 25. The lower recess 22b3 has a flat lower wall surface 222 facing a lower end surface of the lower plate portion 25c of the inner core 25. The right recess 22b4 has, a flat upper wall surface 223 facing an upper end surface of the right plate portion 25d of the inner core 25, and a flat side wall surface 224 facing a right end surface of the right plate portion 25d of the inner core 25. The left recess 22b5 has, a flat upper wall surface 225 facing an upper end surface of the left plate portion 25e of the inner core 25, and a flat side wall surface 226 facing a left end surface of the left plate portion 25e of the inner core 25.

As illustrated in FIG. 10, the protrusions 22g are formed at five positions in total, that is, on the lower wall surface 222 of the lower recess 22b3, the upper wall surface 223 of the right recess 22b4, the side wall surface 224 of the right recess 22b4, the upper wall surface 225 of the left recess 22b5, and the side wall surface 226 of the left recess 22b5. Each of the protrusions 22g is disposed at the center of each of the surfaces when viewed from the front side. Hereinafter, the protrusion 22g formed on the lower wall surface 222 of the lower recess 22b3 is referred to as a first protrusion 22g1, the protrusion 22g formed on the upper wall surface 223 of the right recess 22b4 is referred to as a second protrusion 22g2, the protrusion 22g formed on the side wall surface 224 of the right recess 22b4 is referred to as a third protrusion 22g3, the protrusion 22g formed on the upper wall surface 225 of the left recess 22b5 is referred to as a fourth protrusion 22g4, and the protrusion 22g formed on the side wall surface 226 of the left recess 22b5 is referred to as a fifth protrusion 22g5.

Figure 12:
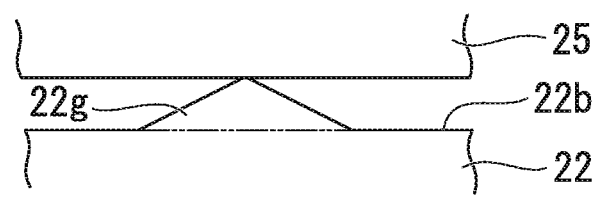
FIG. 12 is an enlarged schematic view including a protrusion included in the radar cover according to the second embodiment of the present invention.

FIG. 12 is an enlarged schematic view of the protrusion 22g. In addition to FIG. 12, also in the other drawings, the protrusion 22g is drawn largely so as to be visually recognizable. The protrusion amount of the actual protrusion 22g from the inner wall surface of the inner core housing recess 22b of the transparent member 22 to a distal end thereof is, for example, 0.1 mm or less. As illustrated in FIG. 12, the protrusion 22g protrudes from an inner wall side surface of the inner core housing recess 22b (a surface connecting the bottom surface (front surface) of the inner core housing recess 22b to the print layer forming region 2R out of the inner wall surface) toward a side of the inner core 25 (a direction along the front surface of the transparent member 22), and is narrowed from a root thereof toward a distal end thereof. In the present embodiment, the width of the protrusion 22g when viewed from the thickness direction decreases toward a distal end thereof. The protrusion 22g is formed with a length from a bottom of the inner core housing recess 22b to an opening end thereof. Such a protrusion 22g positions the inner core 25 in the inner core housing recess 22b in a direction along a front surface of the transparent member 22 by bringing a distal end thereof into contact with the inner core 25.

More specifically, the first protrusion 22g1 regulates movement of the inner core 25 downward with respect to the transparent member 22 by bringing a distal end thereof into contact with the lower end surface of the lower plate portion 25c of the inner core 25.

The second protrusion 22g2 regulates movement of the inner core 25 upward with respect to the transparent member 22 by bringing a distal end thereof into contact with the upper end surface of the right plate portion 25d of the inner core 25. The third protrusion 22g3 regulates movement of the inner core 25 to the right with respect to the transparent member 22 by bringing a distal end thereof into contact with the right end surface of the right plate portion 25d of the inner core 25. The fourth protrusion 22g4 regulates movement of the inner core 25 upward with respect to the transparent member 22 by bringing a distal end thereof into contact with the upper end surface of the left plate portion 25e of the inner core 25. The fifth protrusion 22g5 regulates movement of the inner core 25 to the left with respect to the transparent member 22 by bringing a distal end thereof into contact with the left end surface of the left plate portion 25e of the inner core 25.

Among these protrusions 22g, the first protrusion 22g1, the second protrusion 22g2, and the fourth protrusion 22g4 regulate movement (linear movement) of the inner core 25 with respect to the transparent member 22 in the up-down direction, and position the inner core 25 in the inner core housing recess 22b in the up-down direction. The first protrusion 22g1, the second protrusion 22g2, and the fourth protrusion 22g4 regulate rotation of the inner core 25 with respect to the transparent member 22 when viewed from a direction orthogonal to a front surface of the transparent member 22, and position the inner core 25 in the inner core housing recess 22b in the rotation direction. That is, each of the first protrusion 22g1, the second protrusion 22g2, and the fourth protrusion 22g4 functions as both a rotation regulating protrusion for regulating movement of the inner core 25 with respect to the transparent member 22 in a rotation direction when viewed from a direction orthogonal to a front surface of the transparent member 22 (rotation direction around an axis intersecting with a front surface of the transparent member 22) and a linear movement regulating protrusion (first linear movement regulating protrusion) for regulating movement of the inner core 25 with respect to the transparent member 22 in a linear direction along the front surface of the transparent member 22.

Among the protrusions 22g, the third protrusion 22g3 and the fifth protrusion 22g5 regulate movement (linear movement) of the inner core 25 with respect to the transparent member 22 in the left-right direction, and position the inner core 25 in the inner core housing recess 22b in the left-right direction. That is, each of the third protrusion 22g3 and the fifth protrusion 22g5 functions as a linear movement regulating protrusion (second linear movement regulating protrusion) for regulating movement of the inner core 25 with respect to the transparent member 22 in a linear direction along the front surface of the transparent member 22.

The inner core 25 is positioned by these protrusions 22g. As a result, as illustrated in FIG. 10, a minute gap corresponding to the protrusion amount of each of the protrusions 22g is formed between the lower wall surface 222 of the lower recess 22b3 and the lower end surface of the lower plate portion 25c of the inner core 25, between the upper wall surface 223 of the right recess 22b4 and the upper end surface of the right plate portion 25d of the inner core 25, between the side wall surface 224 of the right recess 22b4 and the right end surface of the right plate portion 25d of the inner core 25, between the upper wall surface 225 of the left recess 22b5 and the upper end surface of the left plate portion 25e of the inner core 25, and between the side wall surface 226 of the left recess 22b5 and the left end surface of the left plate portion 25e of the inner core 25.

Meanwhile, the protrusion 22g is not formed on the upper wall surface 221 of the upper recess 22b2 which is the uppermost surface of the inner core housing recess 22b. Therefore, the upper end surface of the upper plate portion 25b of the inner core 25 is in surface contact with the upper wall surface 221 of the upper recess 22b2.

Since the inner core housing recess 22b is formed to be larger than the inner core 25, a gap is generated at any position between the inner core 25 and the inner wall surface of the inner core housing recess 22b. Here, in the radar cover 21 of the present embodiment, the protrusion 22g positions the inner core 25 in the inner core housing recess 22b. As a result, the position where the gap is formed and a gap dimension can be set within predetermined ranges of position and amount.

Subsequently, a method for manufacturing the radar cover 21 of the present embodiment will be described with reference to FIGS. 13 to 18.

Figure 13:
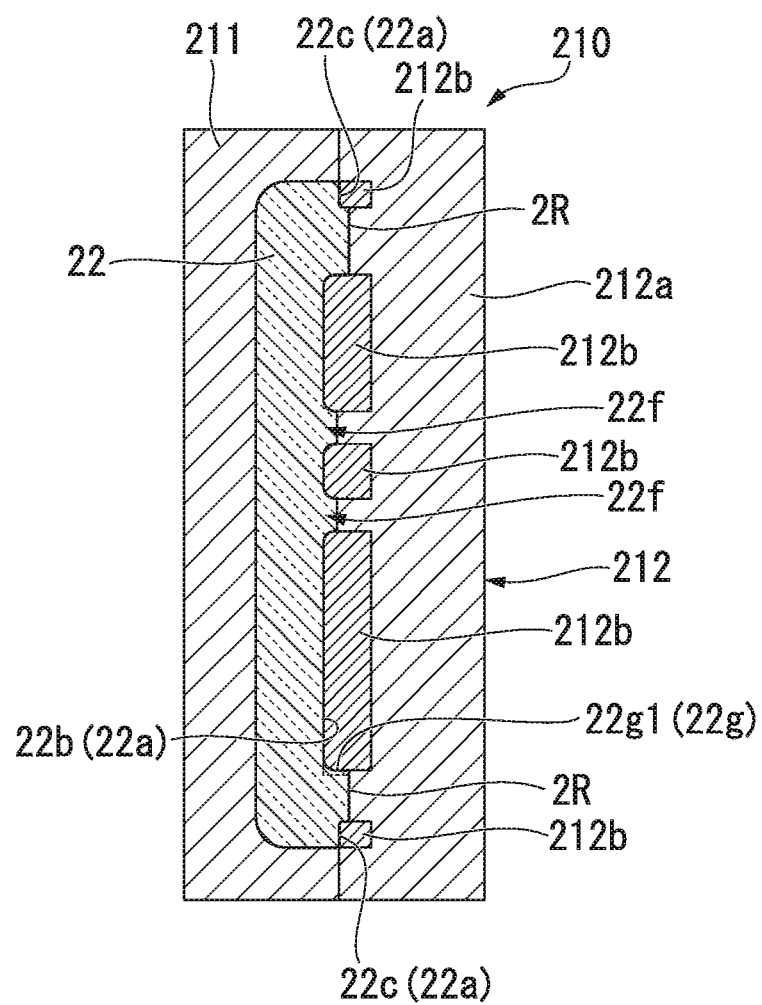
FIG. 13 is a schematic view for explaining a method for manufacturing the radar cover according to the second embodiment of the present invention.

First, as illustrated in FIG. 13, the transparent member 22 is formed. Note that FIG. 13 is a cross-sectional view at the same position as FIG. 11. Here, the transparent member 22 is formed by injection molding using a die 210. The die 210 has a fixed side cavity die 211 and a moving side core die 212. Furthermore, in the present embodiment, the core die 212 has, a base 212a forming the print layer forming region 2R, and a nest 212b for forming the recess 22a. The nest 212b is separated from the base 212a of the core die 212 and protrudes from a front surface of the base 212a toward a side of the cavity die 211 in a state of being fixed to the base 212a. In the present embodiment, the protrusion 22g for positioning the inner core 25 is formed in the step illustrated in FIG. 13.

Figure 14:
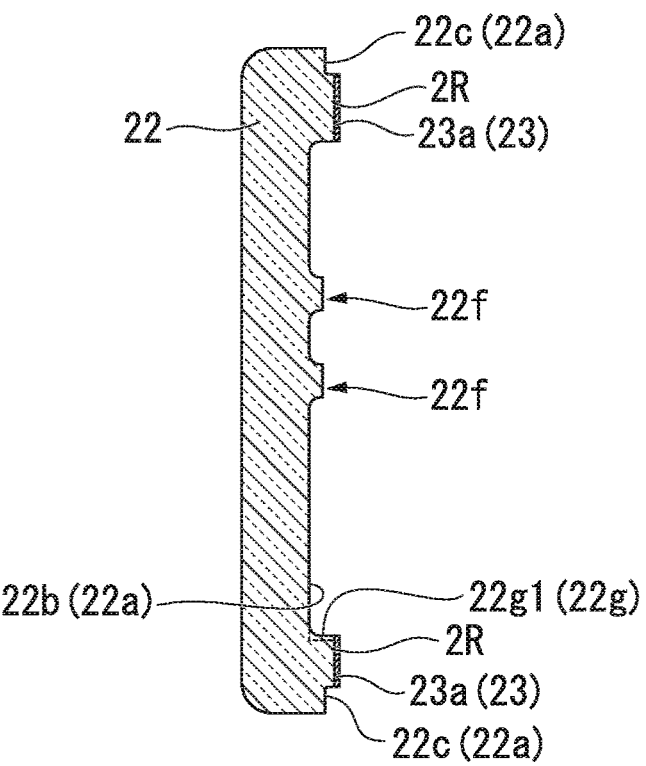
FIG. 14 is a schematic view for explaining the method for manufacturing the radar cover according to the second embodiment of the present invention.
Figure 15:
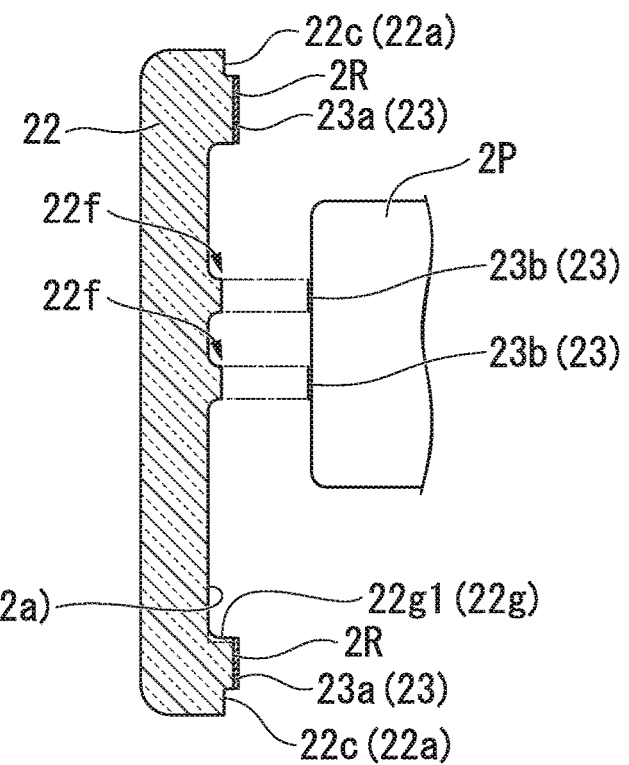
FIG. 15 is a schematic view for explaining the method for manufacturing the radar cover according to the second embodiment of the present invention.

Subsequently, as illustrated in FIGS. 14 and 15, the print layer 23 is formed. Note that FIGS. 14 and 15 are cross-sectional views at the same position as FIG. 11. First, as illustrated in FIG. 14, ink is transferred onto the print layer forming region 2R of the transparent member 22 by a printing method such as a silk printing method, and the ink is dried to form the outer print layer 23a. Next, as illustrated in FIG. 15, ink is transferred onto the distal end surface of the protrusion 22f by a pad printing method, and the ink is dried to form the emblem print layer 23b. Here, ink is transferred from a metallic die onto a silicon pad 2P, and furthermore the pad 2P is pressed against the distal end surface of the protrusion 22f to transfer the ink onto the distal end surface of the protrusion 22f.

Figure 16:
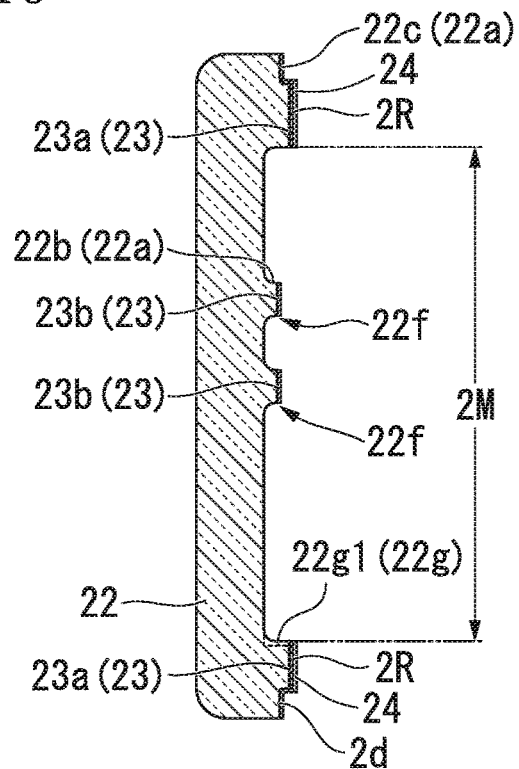
FIG. 16 is a schematic view for explaining the method for manufacturing the radar cover according to the second embodiment of the present invention.

Subsequently, as illustrated in FIG. 16, the paint layer 24 is formed. Note that FIG. 16 is a cross-sectional view at the same position as FIG. 11. Here, in a state in which a region 2M where the emblem 2E illustrated in FIG. 16 is formed is masked, a silver mica paint is sprayed, for example, on a back side of the transparent member 22 on which the print layer 23 is formed, and the mica paint is dried to form the paint layer 24. The paint layer 24 thus formed covers the print layer 23 and directly adheres to the inner wall surface of the entire painted recess 22c except for the region where the emblem 2E is formed.

Figure 17:
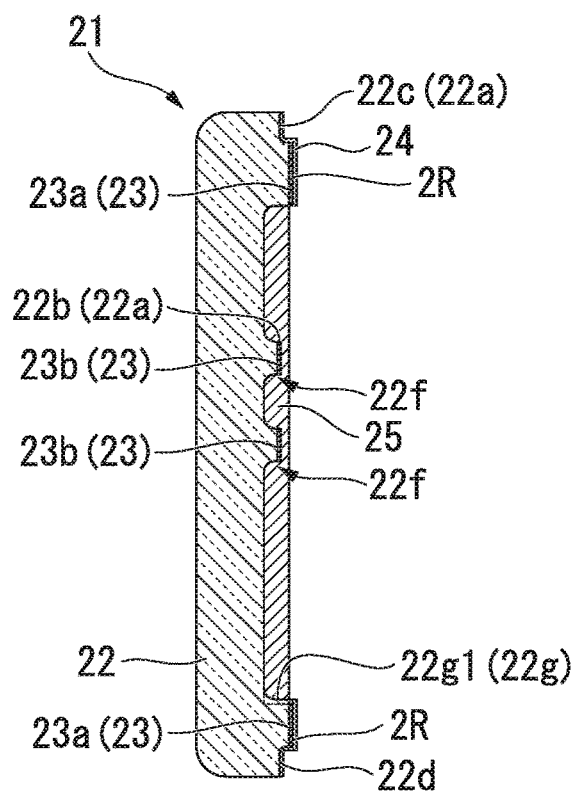
FIG. 17 is a schematic view for explaining the method for manufacturing the radar cover according to the second embodiment of the present invention.

Subsequently, as illustrated in FIG. 17, the inner core 25 is housed in the inner core housing recess 22b. Note that FIG. 17 is a cross-sectional view at the same position as FIG. 11. Here, the inner core 25 formed in parallel to formation of the above-described transparent member 22, print layer 23, or paint layer 24 is housed in the inner core housing recess 22b. The inner core 25 is formed by forming a glittering discontinuous metal film such as an indium layer on a base formed by injection molding in advance by a vacuum vapor deposition method, a sputtering method, or the like. Note that a topcoat layer or an undercoat layer is formed as necessary in the inner core 25. Such an inner core 25 is housed in the inner core housing recess 22b with the glittering discontinuous metal film facing a side of the inner wall surface of the inner core housing recess 22b.

Figure 18:
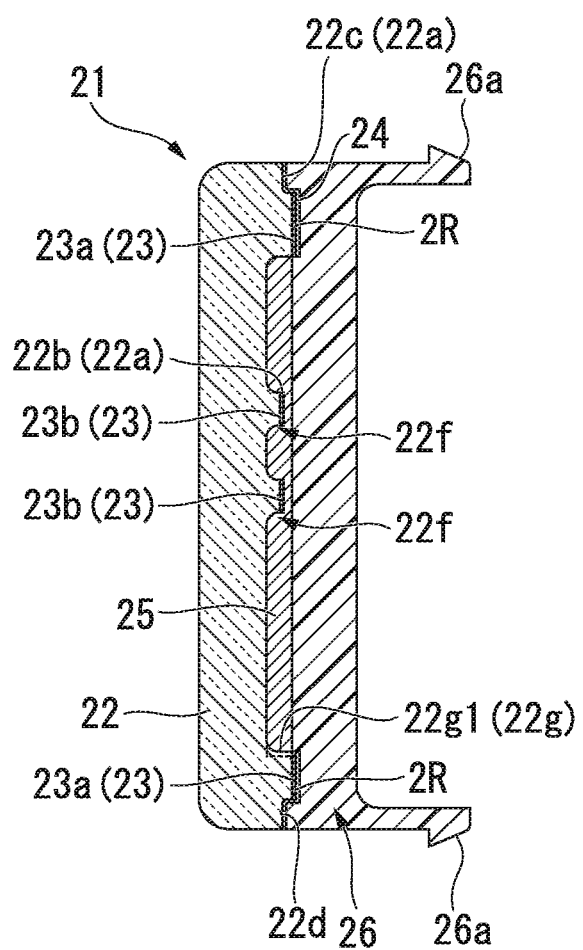
FIG. 18 is a schematic view for explaining the method for manufacturing the radar cover according to the second embodiment of the present invention.

Subsequently, as illustrated in FIG. 18, the support member 26 is formed. Note that FIG. 18 is a cross-sectional view at the same position as FIG. 11. Here, the transparent member 22 having the inner core 25 disposed in the inner core housing recess 22b is disposed inside a die for injection molding, and insert molding for emitting a molten resin to the back side of the transparent member 22 is performed to form the support member 26. Such a support member 26 is welded to the transparent member 22 by heat during insert molding and disposed so as to cover the inner core 25. As a result, the inner core 25 is fixed to the transparent member 22.

According to the radar cover 21 of the present embodiment as described above, the protrusion 22g formed in the transparent member 22 positions the inner core 25 with respect to the transparent member 22 in a direction along a front surface of the transparent member 22. Therefore, it is possible to accurately position the inner core 25 in the inner core housing recess 22b of the transparent member 22. For example, it is possible to prevent an unintentional change in an important portion in the design of the radar cover 21.

For example, in the radar cover 21 of the present embodiment, a region where the character "F" of the emblem 2E is formed is a position that is most easily caught by a person's attention and is the most important portion in the design of the radar cover 21. If a positional relationship between the distal end surface of the protrusion 22f of the transparent member 22 on which the print layer 23 is formed and the groove of the inner core 25 where the protrusion 22f is formed is displaced with respect to a normal position in the region where the character "F" is formed, failure in design may occur, for example, an edge of the character "F" visually recognized from the outside appears slightly double due to an influence of reflection on the inner wall surface of the groove or the like. Therefore, when the inner core 25 moves with respect to the transparent member 22 due to an external force or the like applied at the time of insert molding, the design at an important position may unintentionally change slightly. Meanwhile, according to the radar cover 21 of the present embodiment, since the inner core 25 is positioned with respect to the transparent member 22 by the protrusions 22g, it is possible to prevent displacement of the inner core 25 with respect to the transparent member 22 and to prevent a design change in the region where the character "F" important in design is formed.

In the radar cover 21 of the present embodiment, the protrusion 22g is formed on a flat surface of the transparent member 22. Therefore, as compared with a case where the protrusion 22g is formed on a curved surface, it is possible to easily form the protrusion 22g and to dispose a distal end surface of the protrusion 22g at a desired position. Since the protrusion 22g is formed so as to be narrowed from a root thereof toward a distal end thereof, the contact area between the protrusion 22g and the inner core 25 is reduced, the inner core 25 is easily disposed in the inner core housing recess 22b, and the inner core 25 can be accurately positioned.

The radar cover 21 of the present embodiment has, the rotation regulating protrusion (first protrusion 22g1, second protrusion 22g2, and fourth protrusion 22g4) for regulating movement of the inner core 25 with respect to the transparent member 22 in a rotation direction when viewed from a direction orthogonal to a front surface of the transparent member 22, and a linear movement regulating protrusion (first protrusion 22g1 to fifth protrusion 22g5) for regulating movement of the inner core 25 with respect to the transparent member 22 in a linear direction along the front surface of the transparent member 22. Therefore, movement of the inner core 25 along the front surface of the transparent member 22 can be regulated more reliably.

In the radar cover 21 of the present embodiment, the protrusion 22g is formed so as to protrude from the inner wall side surface of the inner core housing recess 22b of the transparent member 22 in a direction along the front surface of the transparent member 22. By thus forming the protrusion 22g as a portion of the transparent member 22, it is difficult for the protrusion 22g to be visually recognized from the outside.

In the radar cover 21 of the present embodiment, the protrusion 22g is formed avoiding the upper wall surface 221 which is the uppermost surface of the inner core housing recess 22b. Therefore, the upper wall surface 221 is in contact with the uppermost surface of the inner core 25, and no gap is generated between the upper wall surface 221 and the uppermost surface of the inner core 25. Generally, a person who visually recognizes the emblem 2E views the emblem 2E in such a manner that the person looks down on the emblem 2E obliquely from above. Therefore, the eyes tend to be focused on the vicinity of the upper wall surface 221. Meanwhile, according to the radar cover 21 of the present embodiment, there is no gap between the upper wall surface 221 and the uppermost surface of the inner core 25. Therefore, it is possible to prevent an edge of the emblem 2E from appearing double at the portion on which the eyes are focused, and a person viewing the emblem 2E does not feel strangeness.

In the radar cover 21 of the present embodiment, a plurality of protrusions 22g is formed symmetrically when viewed from the front side (direction orthogonal to a front surface of the transparent member 22). Therefore, a gap formed between the inner core 25 and the inner wall side surface of the inner core housing recess 22b is also symmetrical. Generally, the outer shape of the emblem 2E is symmetrical. Therefore, since the gap formed between the inner core 25 and the inner wall side surface of the inner core housing recess 22b is also symmetrical, the gap is also recognized as a portion of design, and it is possible to prevent a person viewing the emblem 2E from feeling strangeness.

In the radar cover 21 of the present embodiment, the protrusion 22g is formed such that the protrusion amount thereof is, for example, 0.1 mm or less. This makes it possible to make the protrusion 22g less conspicuous in design and to reduce the gap formed between the inner core 25 and the inner wall side surface of the inner core housing recess 22b. This prevents an edge of the emblem 2E from appearing double, and a person viewing the emblem 2E does not feel strangeness.

Hitherto, the preferred embodiment of the present invention has been described with reference to the attached drawings, but the present invention is not limited to the above embodiment. The shapes, the combinations, and the like of the respective constituent members described in the above embodiment are merely examples, and various modifications can be made based on design requirement or the like without departing from the gist of the present invention.

For example, in the above embodiment, the configuration in which the protrusion 22g is formed as a portion of the transparent member 22 has been described. However, the present invention is not limited thereto. For example, it is possible to adopt a configuration in which the inner core 25 has a protrusion. A protrusion may be formed on each of the transparent member 22 and the inner core 25. For example, a protrusion having functions equivalent to those of the protrusions 22g3 and 22g5 of the above embodiment may be formed on the inner core 25.

In the above embodiment, a configuration in which the protrusion 22g is formed so as to be narrowed from a root thereof toward a distal end thereof when viewed from a direction orthogonal to the front surface of the transparent member 22 has been adopted. However, the present invention is not limited thereto, and can adopt a configuration in which protrusions of different shapes are formed. For example, the shape of the protrusion when viewed from the thickness direction may be a triangle, an arc, or a rectangle with a narrow width.

In the radar cover 21 of the above embodiment, it has been described that the important portion in the design of the emblem 2E is the region where the character "F" is formed. However, the important portion in the radar cover 21 is not necessarily limited to the portion where a character is formed. For example, an impressive figure or pattern may be an important portion in design of a radar cover. A portion having an impressive shape may be an important portion in design of a radar cover.

DESCRIPTION OF THE REFERENCE SYMBOLS

11, 21: Radar cover
12, 22: Transparent member
12a, 22a: Recess
12b, 22b: Inner core housing recess (housing recess)
12c, 22c: Painted recess
12d, 22d: Frame-like portion
12e, 22e: Mesh-like portion
13, 23: Print layer
14, 24: Paint layer
15, 25: Inner core (colored core)
16, 26: Support member
16b: Protrusion
22f: Protrusion
22g: Protrusion
1D, 2D: Outer design portion
1E, 2E: Emblem
1R, 2R: Print layer forming region
1S: Virtual surface
1X, 2X: Radar unit

What is claimed is:

1. A radar cover disposed on a path of a radio wave of a radar unit for detecting a surrounding situation of a vehicle, the radar cover comprising:
   a plate-shaped transparent member comprising a housing recess recessed toward a front and formed on a back surface thereof;
   a colored core housed in the housing recess in a state of being in contact with a bottom surface of the housing recess; and
   a support member bonded to the back surface of the transparent member, wherein
   in at least a portion of a region forming the housing recess when viewed from a front side of the transparent member, a depth dimension of the housing recess is set to be larger than a thickness dimension of the colored core, and a portion of the support member is filled in a region where the colored core is not disposed in a space surrounded by the housing recess,
   a thickness of a part of the support member, the part of the support member facing the housing recess of the transparent member in a thickness direction of the transparent member, is greater than a distance obtained by subtracting the thickness dimension of the colored core from the depth dimension of the housing recess, and
   the support member is in direct contact with a part of an inner wall surface of the housing recess, the inner wall surface of the housing recess connecting the bottom surface of the housing recess and the back surface of the transparent member.

2. The radar cover according to claim 1, wherein the inner wall surface of the housing recess is bent and connected to the back surface of the transparent member.

3. The radar cover according to claim 1, wherein the colored core comprises a discontinuous metal film disposed on a surface layer thereof and capable of transmitting the radio wave.

4. A method for manufacturing a radar cover disposed on a path of a radio wave of a radar unit for detecting a surrounding situation of a vehicle, wherein
   the radar cover comprises:
   a plate-shaped transparent member comprising a housing recess recessed toward a front and formed on a back surface thereof;
   a colored core housed in the housing recess in a state of being in contact with a bottom surface of the housing recess; and
   a support member bonded to the back surface of the transparent member, and
   a thickness of a part of the support member, the part of the support member facing the housing recess of the transparent member in a thickness direction of the transparent member, is greater than a distance obtained by subtracting a thickness dimension of the colored core from a depth dimension of the housing recess, and the support member is in direct contact with a part of an inner wall surface of the housing recess, the inner wall surface of the housing recess connecting the bottom surface of the housing recess and the back surface of the transparent member, and
   the method comprises:
   a transparent member forming step of forming the transparent member comprising the housing recess in which the depth dimension is set to be larger than the thickness dimension of the colored core in at least a portion of a region forming the housing recess when viewed from a front side of the transparent member;
   a colored core disposing step of disposing the colored core in the housing recess in a state of being in contact with a bottom of the housing recess; and
   a support member forming step of forming the support member on a back side of the transparent member by injection molding such that the thickness of the part of the support member facing the housing recess of the transparent member in the thickness direction is greater than the distance obtained by subtracting the thickness dimension of the colored core from the depth dimension of the housing recess and that the support member is in direct contact with the part of the inner wall surface of the housing recess, the inner wall surface connecting the bottom surface of the housing recess and the back surface of the transparent member.

5. The method for manufacturing a radar cover according to claim 4, wherein in the transparent member forming step, the transparent member in which the inner wall surface of the housing recess is bent and connected to the back surface is formed.

6. The method for manufacturing a radar cover according to claim 4, wherein in the colored core disposing step, the colored core comprising a discontinuous metal film capable of transmitting the radio wave on a surface layer thereof is disposed in the housing recess.

7. A radar cover comprising:
- a transparent member comprising a recess formed on a back surface thereof;
- a colored core housed in the recess; and
- a support member bonded to the back surface of the transparent member and supporting the transparent member, wherein
- the transparent member has a protrusion for positioning the colored core with respect to the transparent member in a direction along a front surface of the transparent member, and
- the protrusion is formed so as to protrude in a direction along a front surface of the transparent member from an inner wall side surface of the recess, the inner wall side surface of the recess connecting a bottom surface of the recess and the back surface of the transparent member.

8. The radar cover according to claim 7, wherein the protrusion is disposed on a flat surface disposed on the transparent member.

9. The radar cover according to claim 7, wherein the protrusion is formed so as to be narrowed from a root thereof toward a distal end thereof.

10. The radar cover according to claim 7, wherein the protrusion includes a rotation regulating protrusion for regulating movement of the colored core with respect to the transparent member in a rotation direction around an axis intersecting with a front surface of the transparent member; and a linear movement regulating protrusion for regulating movement of the colored core with respect to the transparent member in a linear direction along the front surface of the transparent member.

11. The radar cover according to claim 7, wherein the protrusion is formed so as to avoid an uppermost surface of the recess.

12. The radar cover according to claim 7, wherein a protrusion amount of the protrusion is 0.1 mm or less.

* * * * *